United States Patent
Takada et al.

(10) Patent No.: US 7,864,800 B2
(45) Date of Patent: Jan. 4, 2011

(54) COMMUNICATION SYSTEM, AUXILIARY DEVICE AND COMMUNICATION METHOD

(75) Inventors: Aritoki Takada, Odawara (JP); Tadashi Takeuchi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 259 days.

(21) Appl. No.: 11/939,618

(22) Filed: Nov. 14, 2007

(65) Prior Publication Data
US 2008/0181222 A1 Jul. 31, 2008

(30) Foreign Application Priority Data
Nov. 14, 2006 (JP) .............................. 2006-308452

(51) Int. Cl.
*H04J 3/16* (2006.01)
*H04J 3/22* (2006.01)
*H04J 3/24* (2006.01)

(52) U.S. Cl. .................. 370/466; 370/465; 370/475

(58) Field of Classification Search .............. 370/246, 370/352, 395.54, 466
See application file for complete search history.

(56) References Cited

U.S. PATENT DOCUMENTS

| | | | |
|---|---|---|---|
| 7,593,388 B1 * | 9/2009 | Mitchell et al. ............ 370/352 |
| 7,609,717 B2 * | 10/2009 | Miyata et al. ............. 370/466 |
| 2002/0021697 A1 * | 2/2002 | Tsuchiya et al. ........... 370/392 |
| 2002/0075872 A1 * | 6/2002 | Ogawa et al. ............. 370/392 |
| 2002/0131364 A1 * | 9/2002 | Virtanen et al. ............ 370/230 |
| 2002/0150104 A1 * | 10/2002 | Hamamoto et al. ......... 370/392 |
| 2002/0181464 A1 * | 12/2002 | Tsuchiya et al. ........... 370/392 |
| 2003/0110292 A1 * | 6/2003 | Takeda et al. ............. 709/245 |
| 2003/0225912 A1 * | 12/2003 | Takeda et al. ............. 709/246 |
| 2004/0246991 A1 * | 12/2004 | Tsuzuki et al. ............. 370/466 |
| 2004/0252717 A1 * | 12/2004 | Solomon et al. ........... 370/466 |
| 2005/0066038 A1 * | 3/2005 | Sakamoto et al. .......... 709/227 |
| 2008/0080519 A1 * | 4/2008 | Park et al. ............. 370/395.54 |
| 2008/0114898 A1 * | 5/2008 | Takeda et al. ............. 709/245 |

FOREIGN PATENT DOCUMENTS

| JP | 2003-046530 | 2/2003 |
|---|---|---|
| JP | 2005-167301 | 6/2005 |

* cited by examiner

*Primary Examiner*—Jayanti K Patel
*Assistant Examiner*—Christopher T Wyllie
(74) *Attorney, Agent, or Firm*—Antonelli, Terry, Stout & Kraus, LLP.

(57) ABSTRACT

To provide technology that makes communication possible using an NAT device that does not correspond to protocol even when protocol that stores the IP address in the payload section to carry out communication is used.

The technology consists of a CL device 110 connected to a global network 160, an SE device 130 connected to a private network 161, an NAT device 120 and a auxiliary device 140 wherein the auxiliary device 140 verifies in what way the address information of the packet communicated to the CL device 110 from the SE device 130 has been converted and notifies the SE device 130 of the address information after the address information has been converted in the NAT device 120.

12 Claims, 21 Drawing Sheets

COMMUNICATION SYSTEM, AUXILIARY DEVICE AND COMMUNICATION METHOD

This application claims a priority from Japanese Patent Application No. 2006-308452 filed on Nov. 14, 2006, the entire content of which is hereby incorporated by reference.

BACKGROUND OF THE INVENTION

This invention relates to technology that enables a primary device connected to a primary network and a secondary device connected to a secondary network to communicate by means of address conversion.

A Network Address Translator (NAT) device is used as a device to enable communication between private and global networks.

As with, for example, Real Time Streaming Protocol (RTSP), there are times when information is included that is considered necessary when conducting IP address communication for the payload part which stores application data. When protocol such as this is used, the information converted by a NAT device differs from that stored in the payload part and there are times when problems can arise with communication.

Technology for converting an IP address included in the packet payload part is described in Japanese Laid-open Patent Publication No. 2005-167301 (Document 1).

SUMMARY OF THE INVENTION

In the technology described in Document 1, as a result of analyzing the packet payload part passing through the NAT device, it is not possible to convert the IP address included in the payload part with regard to the packet generated by protocol which does not respond to the packet protocol when it should.

This invention proposes technology that makes communication possible when using a NAT device that does not respond to protocol even when protocol that stores the IP address in the payload part and carries out communication is used.

By setting up an auxiliary device that prefetches the address information converted by the address conversion device, with this invention, the address information after being converted by the address conversion device is stored in the storage area of the application data in the communication data and communication is carried out.

For example, the present invention is a communication system comprising a primary device connected to a primary network, a secondary device connected to a secondary network and an address conversion device that converts the address information of the communication data transmitted from either the primary device or the secondary device to the other device to the address information corresponding to the other network and in which the secondary device stores the address information of the secondary device in the storage area of the application data in the communication data and transmits the address information to the primary device, wherein an auxiliary device placed between the address conversion device and the primary and secondary devices obtains the address information after the address information of the communication data transmitted from the secondary device to the primary device is converted by the address conversion device and notifies the secondary device, and, the secondary device stores the address information after being notified by the auxiliary device in the storage area of the application data in the communication data and transmits the address information to the primary device.

From the above, according to this invention, by setting up an auxiliary device that prefetches the IP address and the port number converted by the NAT device, it is possible to store both the IP address and the port number after they are converted by the NAT device in the payload part and carry out communication so that even when protocol is used in which information such as the IP address in the payload part is stored and communication carried out, communication is still possible using an NAT device that does not correspond to the protocol.

These and other benefits are described throughout the present specification. A further understanding of the nature and advantages of the invention may be realized by reference to the remaining portions of the specification and the attached drawings.

DETAILED DESCRIPTION OF THE EMBODIMENTS

Figure 1:
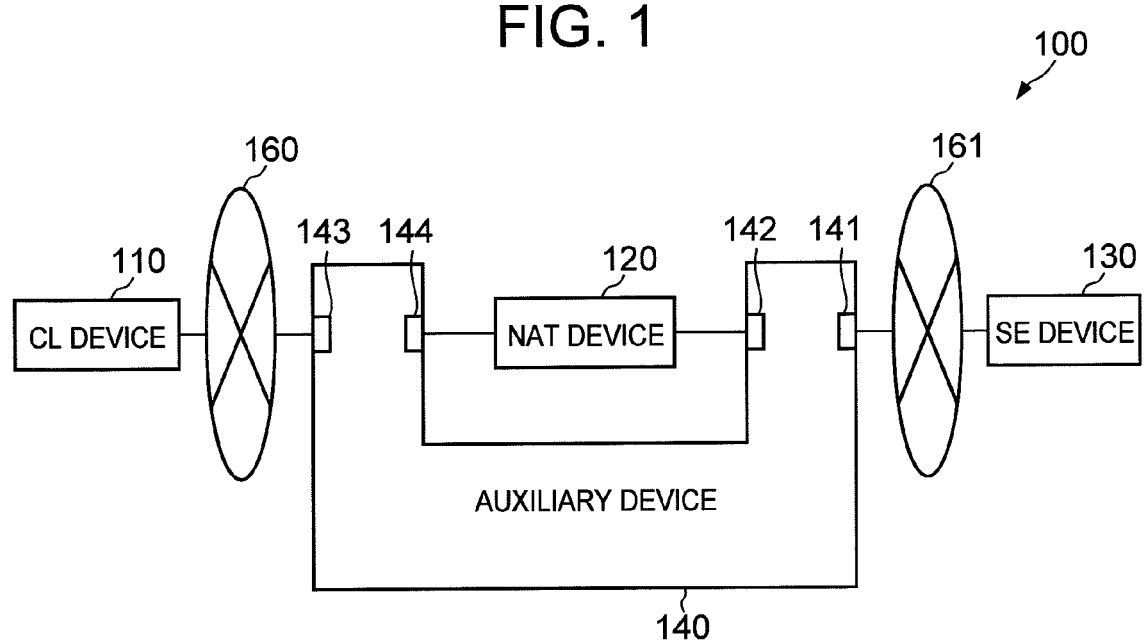
FIG. 1—Schematic diagram of the communication system of the first embodiment.

FIG. 1 is a schematic diagram of a communication system 100 which is an embodiment of this invention.

The communication system 100 comprises a client device 110 (below called CL device), an NAT device 120, a server device 130 (below called SE device) and an auxiliary device 140.

Here in this embodiment, as with the image distribution protocol of RTSP, after conducting a data forwarding control session with Transmission Control Protocol (TCP) or User Datagram Protocol (UDP) when forwarding data between the CL device 110 and the SE device 130, the data forwarding stream through UDP is carried out. In the data forwarding control session, by carrying out data destination notification which contains the IP address and the port number of the CL device 110 which is the destination in the payload part from the CL device 110 to the SE device 130, and in response by carrying out data destination sender notification that contains the IP address and port number of the SE device 130 which is the sender in the payload part from the SE device 130 to the CL device 110 the session is established.

The CL device 110 is connected to the global network 160 and the SE device 130 is connected to the private network 161.

By converting the global IP address in the global network 160 and the private IP address in the private network 161, the NAT device 120 makes two-way communication possible with the CL device 110 and the SE device 130.

Furthermore, since the CL device 110 can be realized in conventionally used computers in which communication through a private network 160 has been possible and since the NAT device 120 can be realized in conventionally used routers which can convert the IP address in the IP header and the port number in the TCP header or the UDP header, their detailed explanation is omitted.

Figure 2:
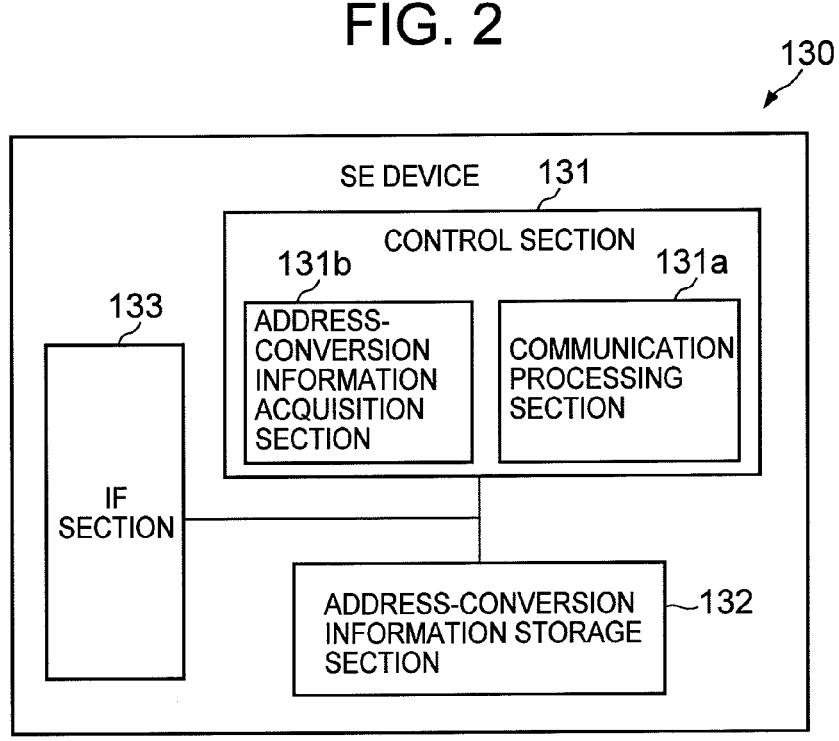
FIG. 2—Schematic diagram of the SE device.

As shown in FIG. 2 (schematic diagram of the SE device 130), the SE device 130 consists of a control section 131, an address-conversion information storage section 132 and an IF section 133.

The control section 131 consists of a communication processing section 131a and an address-conversion information acquisition section 131b.

The communication processing section 131a controls the communication processing through the local network 161.

For example, as explained above, when setting up a data forwarding control session with the CL device 110, the communication processing section 131a receives a data destination notification which contains both the IP address and port number of the CL device 110 which is the destination in the payload part from the CL device 110 and in response controls the processing of transmitting the data destination notification that contains the IP address and port number of the SE device 130 which is the sender in the payload part.

Additionally, the communication processing section 131a also controls the data forwarding stream processing by means of the UDP after the session is set up.

When the address-conversion information acquisition section 131b receives the data destination notification which contains the IP address and port number of the CL device 110 which is the destination in the payload part from the CL device 110 through the IF section 133 to be described later, the address-conversion information acquisition section 131b transmits the IP address and port number of the CL device 110 to the auxiliary device 140 to be described later.

The address-conversion information acquisition section 131b receives at the very least the IP address and port number of the NAT device 120 from the auxiliary device 140 and stores them in the address-conversion information storage section 132. Furthermore, the communication processing section 131a transmits to the CL device 110 through the IF section 133 the data sender notification with the IP address and port number of the NAT device 120 stored in the address-conversion information storage section 132 as the sender.

The IP address and port number of the NAT device 120 received from the auxiliary device 140 are stored in the address-conversion information storage section 132.

Additionally, the IP address or the port number for communicating with the auxiliary device 140 is also stored in the address-conversion information storage section 132.

The IF section 133 is the interface for transmitting and receiving information through the local network 161.

Figure 3:
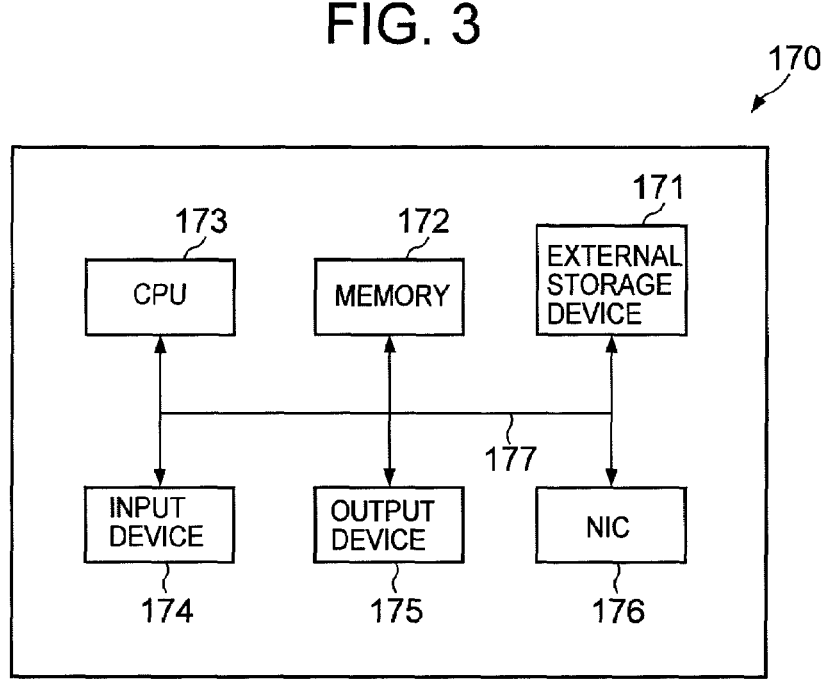
FIG. 3—Schematic diagram of the computer.

The SE device 130 as constructed above can be realized, for example, by a computer 170 shown in FIG. 3 (schematic diagram of the computer 170).

For example, the computer 170 consists of an external storage device 171, a memory 172, a central processing unit (CPU) 173, an input device 174, an output device 175, a network interface card (NIC) 176 and a bus 177 connecting these.

The control section 131 is realizable by having a predetermined program stored in the external storage device 171 read into the memory 172 and executed by the CPU 173, the address-conversion information storage section 132 is realizable through the external storage device 171 and the IF section 133 is realizable through the NIC 176.

Figure 4:
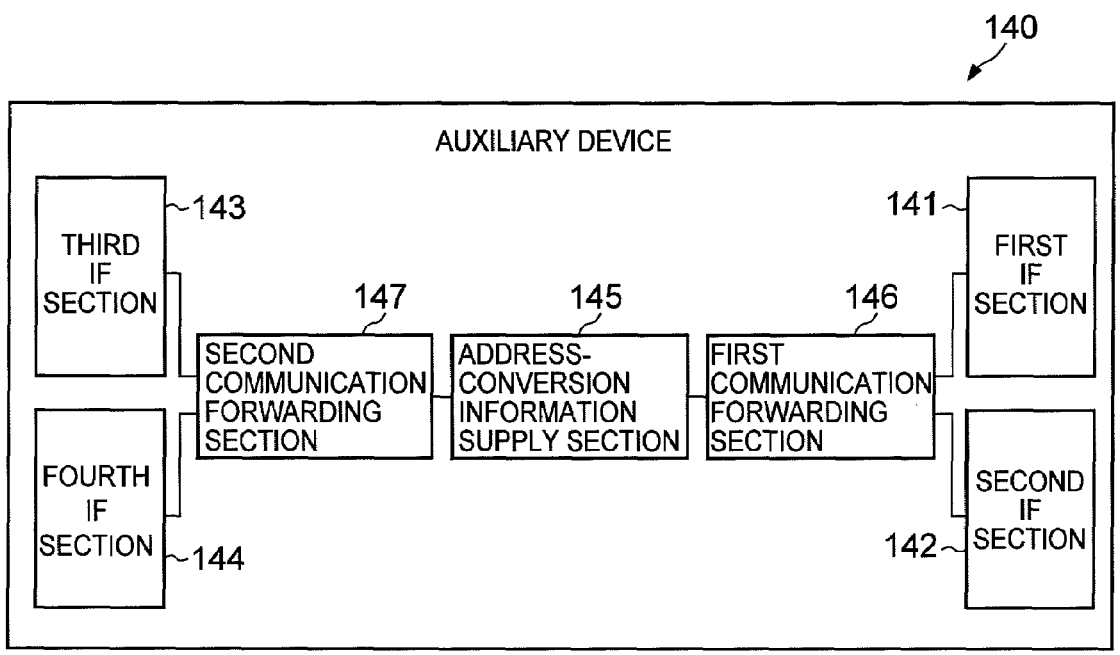
FIG. 4—Schematic diagram of the auxiliary device.

The auxiliary device 140 as shown in FIG. 4 (schematic diagram of the auxiliary device 140) consists of the first IF section 141, the second IF section 142, the third IF section 143, the fourth IF section 144, the address-conversion information supply section 145, the first communication forwarding section 146 and the second communication forwarding section 147.

The first IF section 141, the second IF section 142, the third IF section 143 and the fourth IF section 144 are the interfaces for transmitting and receiving information through the global network 160 or the local network 161.

In this embodiment, as shown in FIG. 1, the first IF section 141 is connected to the local network 161, the second IF section is connected to the interface (not shown in the diagram) for the local network 161 side of the NAT device 120, the third IF section 143 is connected to the global network 160 and the fourth IF section is connected to the interface (not shown in the diagram) of the global network 160 side of the NAT device 120.

The auxiliary device 140 conducts the processing given below when a request for address-conversion information from the SE device 130 is received by the first IF section 141 and passes through other data.

The address-conversion information supply section 145 outputs a dummy packet trial request specifying the IP address and port number of the CL device 110 and the IP address and port number of the SE device 130 to the first communication forwarding section 146 and the second communication forwarding section 147 described below when an address-conversion information request is received from the SE device 130 through the first IF section 141.

The address-conversion information supply section 145 inputs the results (dummy packet reception notification) of the transmission and reception of the dummy packet by means of the first communication forwarding section 146 and the second communication forwarding section 147 from the second communication forwarding section 147, generates an address-conversion information response specifying the IP address and port number of the NAT device 120 obtained through the above results and transmits them to the SE device 130 through the first IF section 141.

When the first communication forwarding section 146 receives the dummy packet trial request from the address-conversion information supply section 145, the first communication forwarding section 146 generates a dummy packet with the IP address and the port number of the CL device 110 as the destination and the IP address and port number of the SE device 130 as the sender and transmits them from the second IF section 142.

When the second communication forwarding section 147 receives the dummy packet trial request from the address-conversion information supply section 145, the second communication forwarding section 147 checks the packet received with the fourth IF section 144 to monitor that the dummy packet with the IP address and port number of the CL device 110 as the destination has been received.

When this dummy packet is received, the second communication forwarding section 147 extracts the IP address and port number of the NAT device 120 input as the sender of the dummy packet and outputs a dummy packet reception notification specifying the extracted IP address and port number to the address-conversion information supply section 145.

Figure 5:
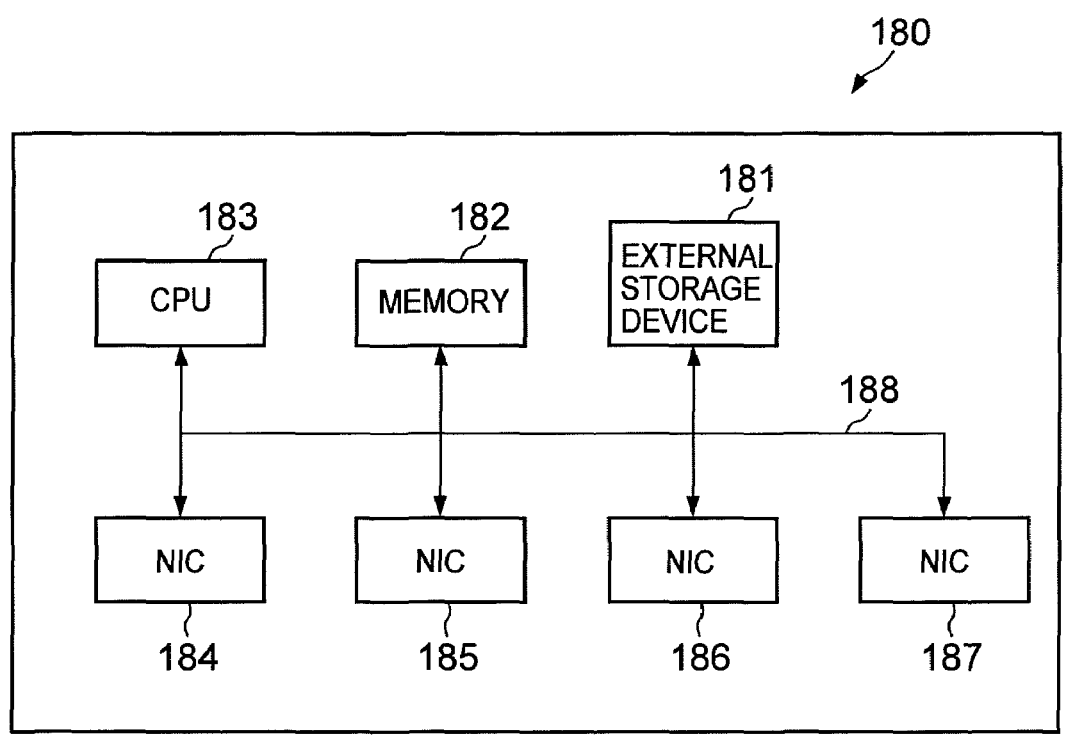
FIG. 5—Schematic diagram of the computer
FIG. 6—Flowchart of the processing after setting up a data forwarding control session in the communication system.

The auxiliary device 140 with the above structure is realizable with a computer 180 shown, for example, in FIG. 5 (schematic diagram of the computer 180).

As shown in the diagram, the computer 180 consists of an external storage device 181, a memory 182, a CPU 183, NICs 184 to 187 and a bus 188 connecting these.

The address-conversion information supply section, the first communication forwarding section 146 and the second communication forwarding section 147 are realizable by having a predetermined program stored in the external storage device 181 read into the memory 182 and executed by the CPU 183, the first IF section 141 is realizable with the NIC 184, the second IF section 142 is realizable with the NIC 185, the third IF section 143 is realizable with the NIC 186 and the fourth IF section is realizable with the NIC 187.

Figure 6:
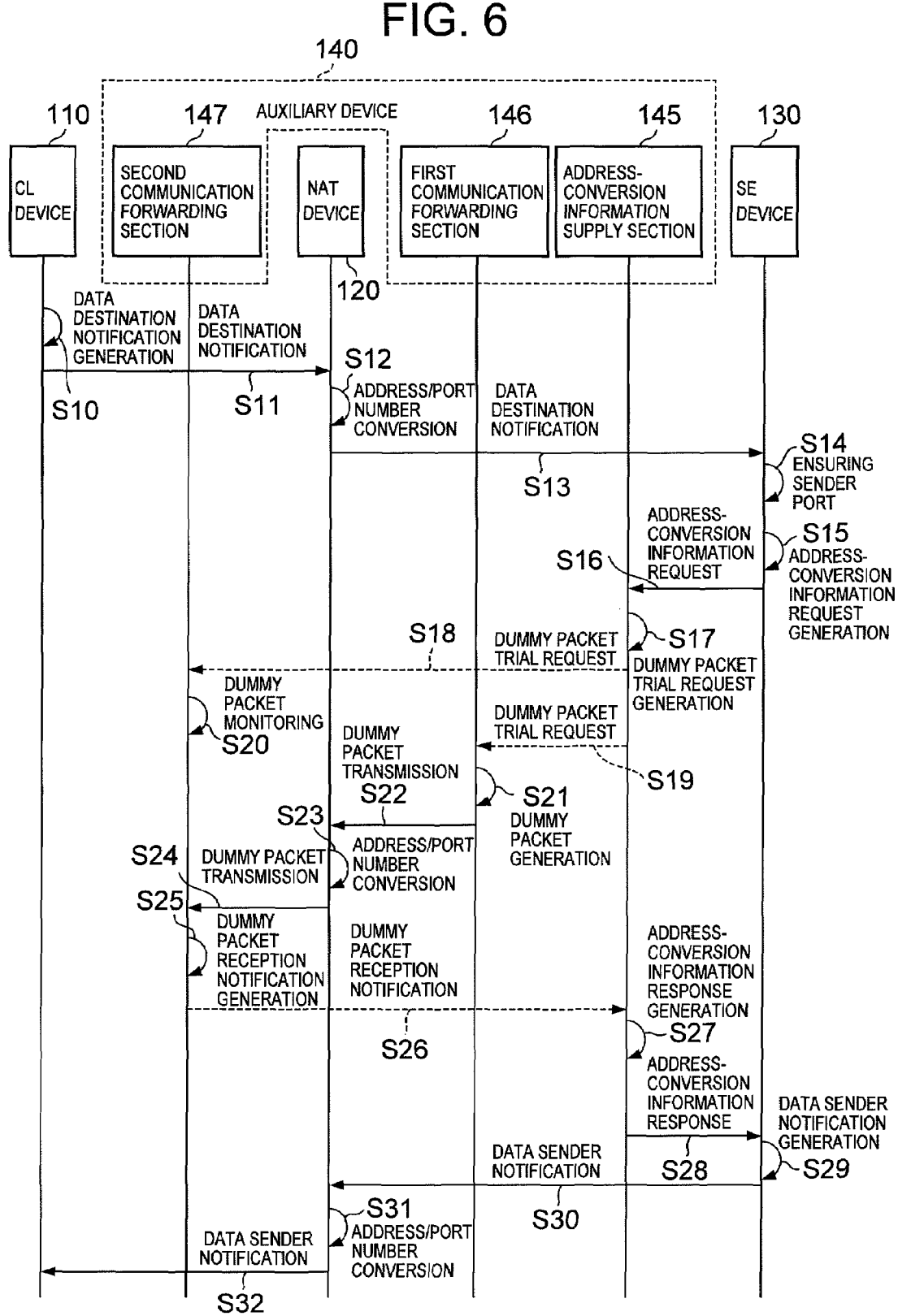

An explanation will be given using the flowchart shown in FIG. 6 of the processing when setting up the data forwarding control session in the communication system 100 structured as given above.

Figure 7:
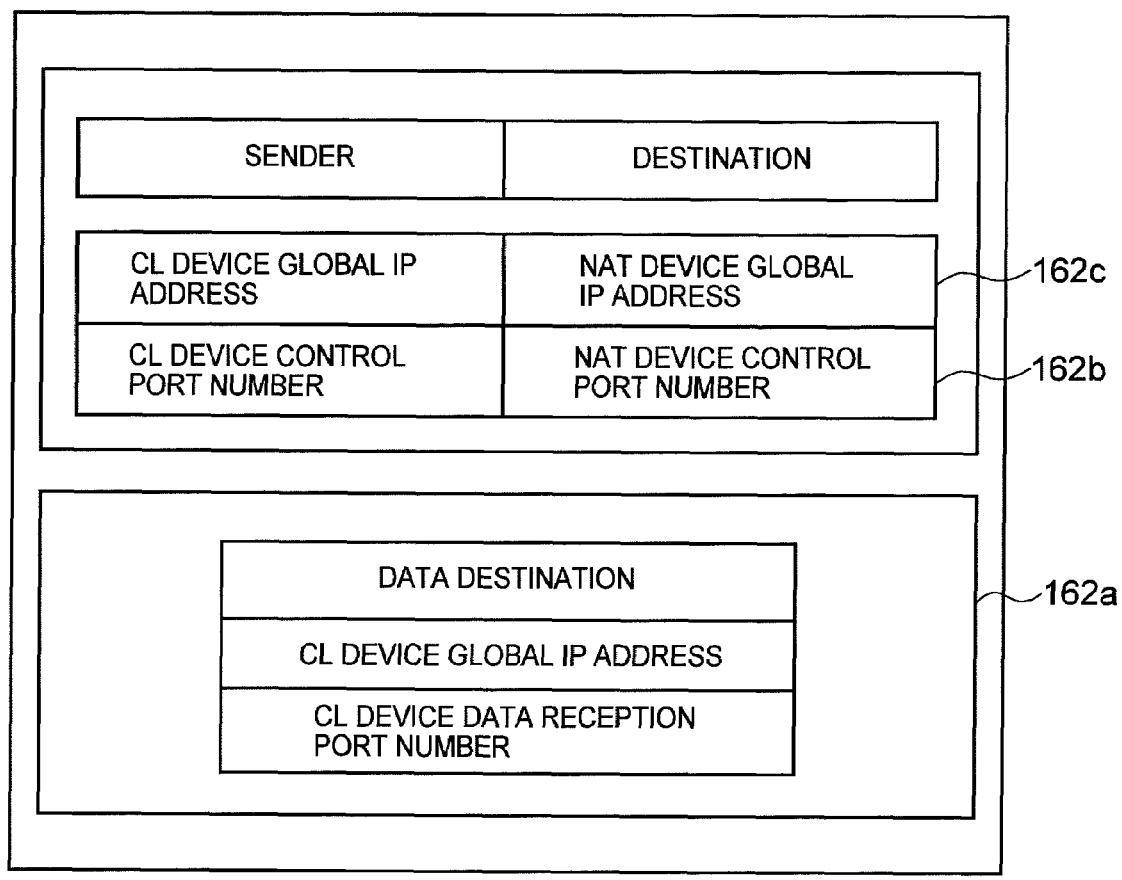
FIG. 7—Schematic diagram of the data destination notification.

First, the CL section 110 generates a data destination notification (S10) and transmits the data destination notification to the SE device 130 (S11). Here, as shown in FIG. 7 (schematic diagram of the data destination notification) for this data destination notification, the global IP address of the CL device 110 which is the data destination of the data from the SE device 130 and the data reception port number of the CL device 110 are stored, for example, in the payload part 162*a*, the control port number of the CL device 110 which is the sender and the control port number of the NAT device 120 which is the destination are stored in the TCP or UDP header 162*b* and the global IP address of the CL device 110 which is the sender and the global IP address of the NAT device 120 which is the destination are stored in the IP header 162*c*.

Figure 8:
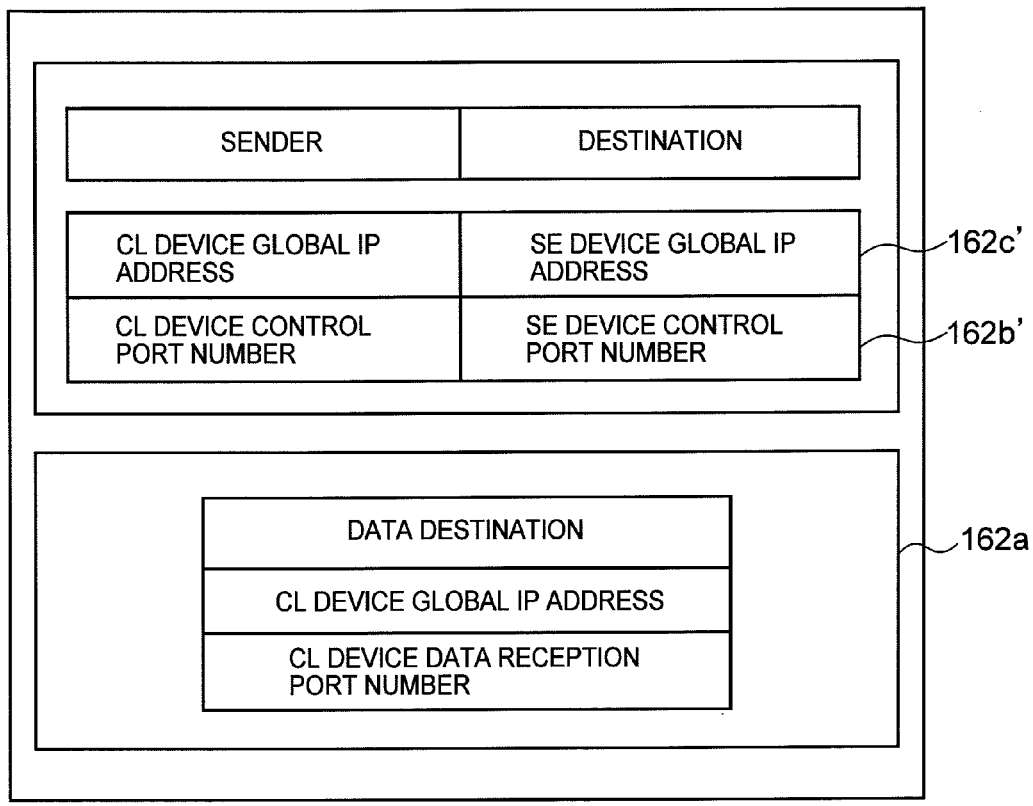
FIG. 8—Schematic diagram data destination notification.

The NAT device 120 which has received this data destination notification converts the IP address and the port number of the destination stored in the data transmission notification header to those for the SE device 130 (S12). For example, as shown in FIG. 8 (schematic diagram of the data destination notification), the control port number of the SE device 130 is stored in the destination of the TCP or the UDP header 162*b*' and the local IP address of the SE device 130 is stored in the IP header 162*c*'. Additionally, since the connection from the CL device 110 to the SE device is from the local network 160 to the private network 161, the NAT device 120 has the control port number and the local IP address of the SE device 130 stored beforehand so that it may do forwarding.

The data destination notification with the header information converted in this manner is forwarded from the NAT device 120 to the SE device 130 (S13).

The SE device 130 which has received the data destination notification secures the sender port in the communication processing section 131*a* (S14) and extracts the global IP address and the data reception port number of the CL device 110 stored in the payload part of the received data destination notification.

Figure 9:
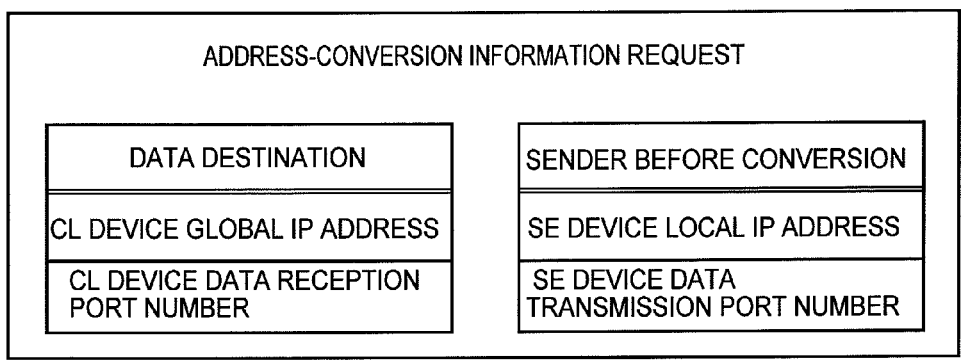
FIG. 9—Schematic diagram of the address-conversion information request.

The address-conversion information acquisition section 131*b* of the SE device 130 generates an address-conversion information request (e.g., refer to FIG. 9) with the global IP address and data reception port number of the CL device 110 extracted by the communication processing section 131*a* as the data destination and the local IP address and the data reception port number of the SE device 130 as the sender before conversion (S15) and transmits them to the auxiliary device 140 through the IF section 133 (S16). Furthermore, in order to differentiate the transmission to the auxiliary device 140 from other data, the transmission to the auxiliary device 140 is accomplished using the unique IP address of the auxiliary device 140 or the unique port number in the address-conversion information request.

Figure 10:
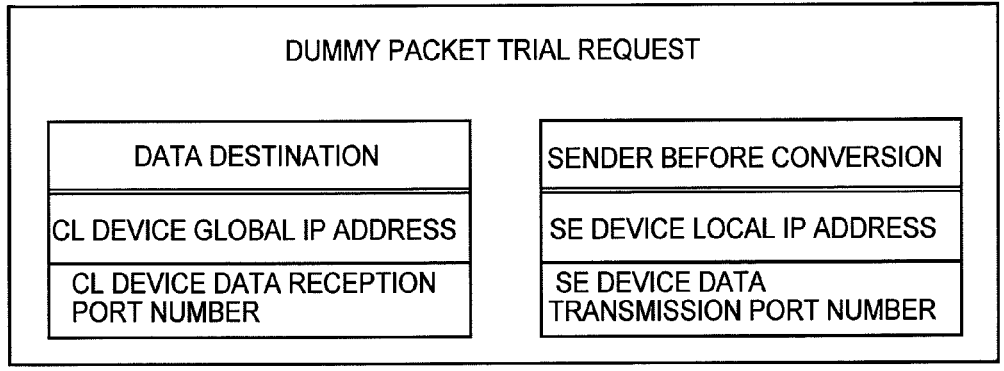
FIG. 10—Schematic diagram dummy packet trial request.

The address-conversion information supply section 145 which has received the address-conversion information request through the first IF section 141 generates a dummy packet trial request (e.g., refer to FIG. 10) with the global IP address and data reception port number of the CL device 110 specified in the address-conversion information request as the data destination and the local IP address and the data transmission port number of the SE device 130 as the sender before conversion (S17) and outputs them to the second communication forwarding section 147 and the first communication forwarding section 146 (S18, S19).

Additionally, so that the dummy packet in the above output transmitted from the first communication forwarding section 146 is definitely received by the second communication forwarding section 147, it should be output to the first communication forwarding section 146 after being output to the second communication forwarding section 147.

The packet received by the fourth IF section 144 is checked in the second communication forwarding section 147 which has received the dummy packet trial request to monitor that the packet with the IP address and the port number of the CL device 110 has been received (S20).

Figure 11:
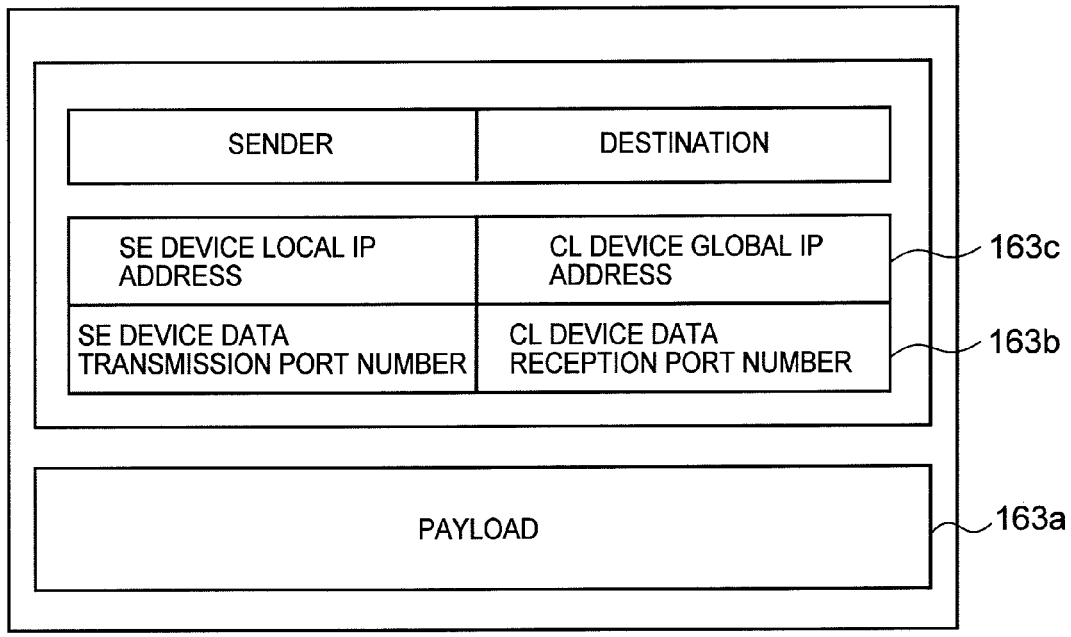
FIG. 11—Schematic diagram of the dummy packet.

Furthermore, as shown, for example, in FIG. 11 (schematic diagram of the dummy packet), optional data (e.g., identifying information so that it can identify that it is the dummy packet) or null data is stored in the payload part 163*a* by the first communication forwarding section 146 which has received the dummy packet trial request, the data transmission port number of the SE device 130 extracted from the dummy packet trial request and the data reception port number of the CL device 110 are stored in the UDP header 163*b* respectively as the sender and the destination, a dummy packet with the local IP address of the SE device 130 extracted from the dummy packet trial request as the sender and the global IP address of the CL device 110 as the destination is generated (S21) and transmitted to the NAT device 120 side through the second IF section 142 (S22).

Figure 12:
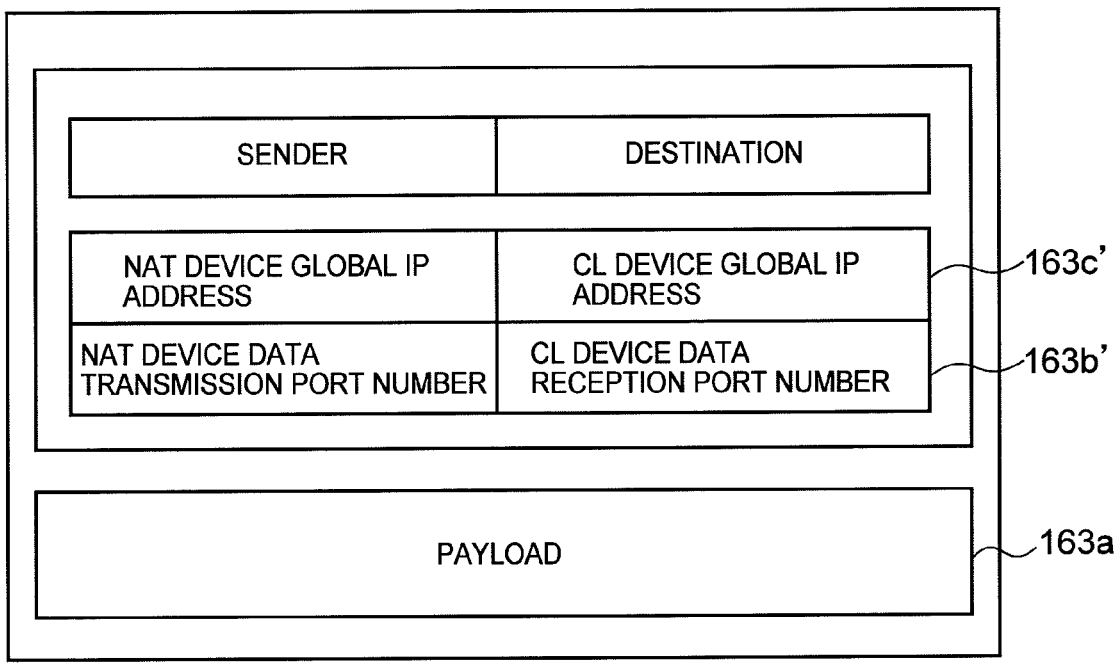
FIG. 12—Schematic diagram of the dummy packet.

As shown in FIG. 12 (schematic diagram of the dummy packet), the data transmission port of the NAT device 120 is stored in the UDP header 163*b*' of the sender of the received dummy packet by the NAT device 120 and the global IP address of the NAT device 120 is stored in the IP header 163*c*' of the sender (S23) and they are forwarded to the CL device 110 which is the destination (S24).

Figure 13:
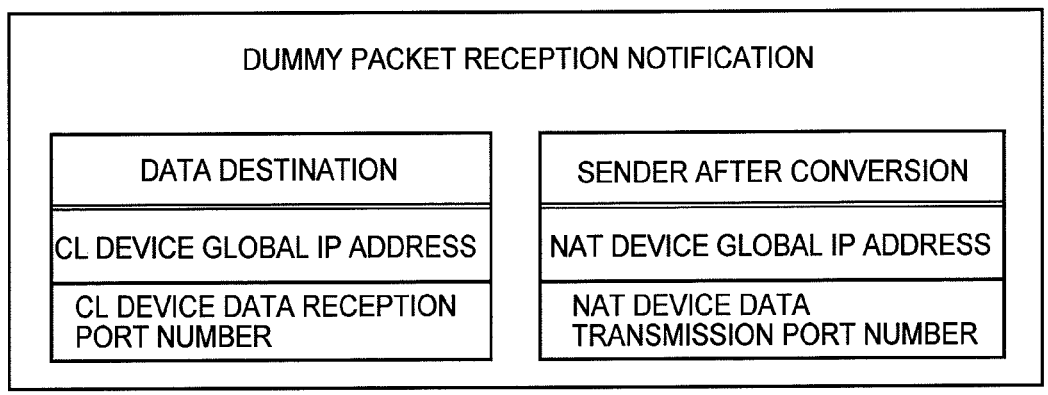
FIG. 13—Schematic diagram of the dummy packet reception notification.

The global IP address and the data reception port number of the CL device 110 and the global IP address and the data transmission port number of the NAT device 120 are extracted from the received packet by the second communication forwarding section 147 which has received the packet through the fourth IF section 144 and as shown, for example, in FIG. 13 (schematic diagram of the dummy packet reception notification), a dummy packet reception notification is generated specifying the global IP address and the data reception port number of the CL device 110 as the data destination and the global IP address and the data transmission port number of the NAT device 120 as the sender after conversion (S25) and output to the address-conversion information supply section 145 (S26).

Figure 14:
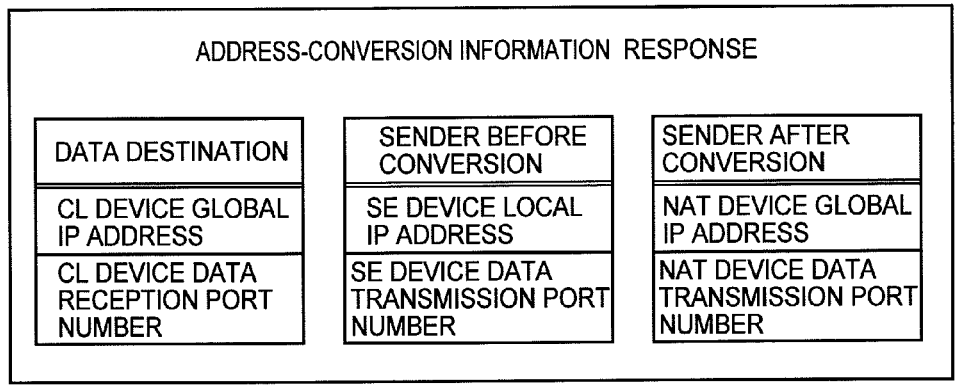
FIG. 14—Schematic diagram of the address-conversion information response.

The global IP address and the data reception port number of the CL device 110 and the global IP address and the data transmission port number of the NAT device 120 are extracted from the dummy packet reception notification by the address-conversion information supply section 145 which has received the dummy reception notification, and the local IP address and the data transmission port number of the SE device 130 which are contained in the address-conversion information request received in Step S16 are also extracted. Then, as shown in, for example, FIG. 14 (schematic diagram of the address-conversion information response), the address-conversion information supply section 145 generates an address-conversion information response specifying the global IP address and the port reception number of the CL device 110 as the data destination, the global IP address and the data transmission port number of the NAT device 120 as the sender after conversion and the local IP address and data transmission port number of the SE device 130 as the sender before conversion (S27) and transmits the address-conversion information response to the SE device 130 (S28).

Figure 15:
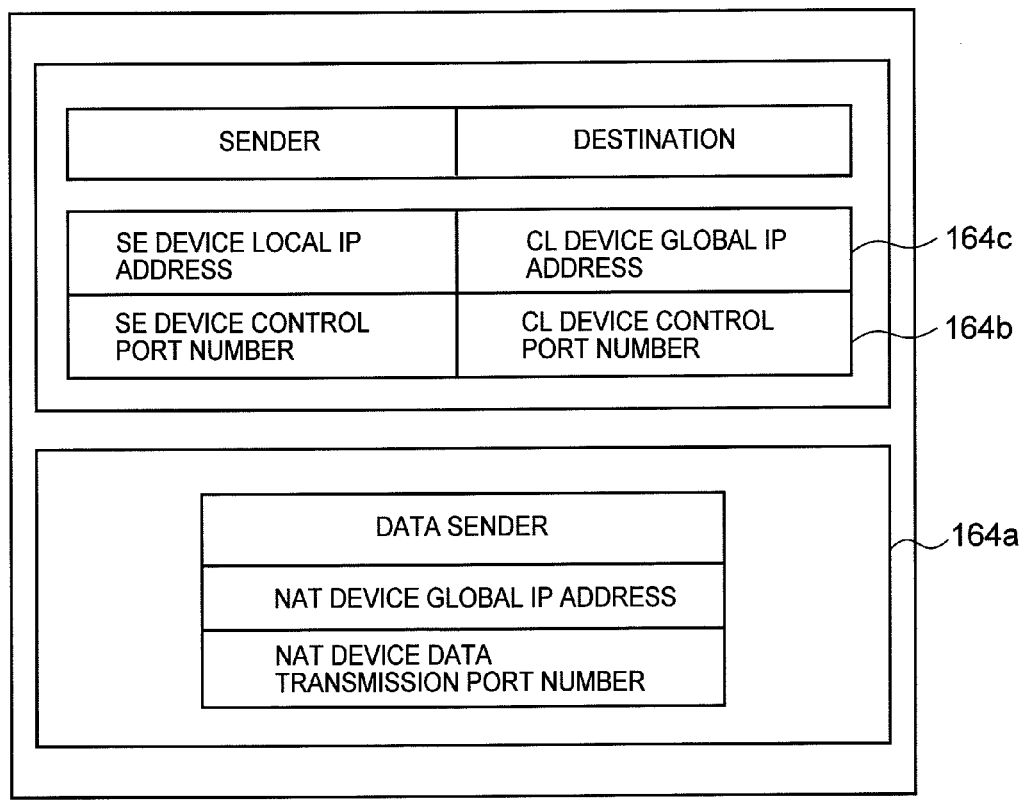
FIG. 15—Schematic diagram of the data sender notification.

In the SE device 130 which has received the address-conversion information response, the received address-conversion information response is stored in the address-conversion information storage section 132 and as shown, for example, in FIG. 15 (schematic diagram of the data sender notification), a data sender notification is generated in which the global IP address and the data transmission port number of the NAT device 130 are stored in the payload part 164*a*, the control port number of the SE device 130 which is the sender and the control port number of the CL device 110 which is the destination are stored in the TCP or the UDP header 164*b*, and the global IP address of the SE device which is the sender and the global IP address of the CL device 110 which is the destination are stored in the IP header 162*c* (S29) and transmitted to the CL device 110 through the IF section 133 (S30).

Figure 16:
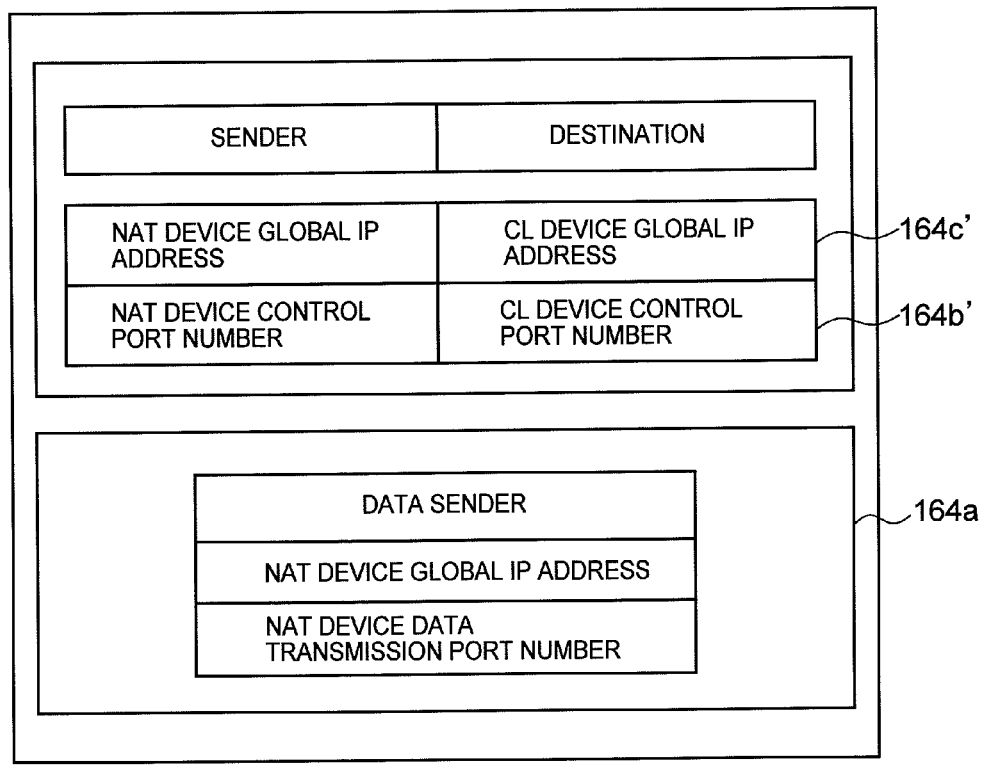
FIG. 16—Schematic diagram of the data sender notification.

As shown, for example, in FIG. 16 (schematic diagram of the data sender notification), in this type of transmitted data sender notification the sender of the TCP or the UDP header 164*b*' is converted to the control port number of the NAT device 120 and the sender of the IP header 164*c*' is converted to the global IP address of the NAT device 120 (S31) and they are forwarded to the CL device 110 (S32).

In light of the above processing, since the port number and IP address of the data sender notification received by the CL device 110 are stored in the payload part 164*a*, and the port number and IP address stored in the UDP header 164*b*' of the packet in the data forwarding stream subsequently received by the CL device 110 and the IP address stored in the IP header 164*c*' are in agreement, they can be processed as justified data.

Through the cooperation in the configuration of this embodiment of the NAT device 120, the auxiliary device 140 set up between the networks 160 and 161 on both sides of the NAT device 120 and the SE device set up with an address-conversion information storage section 131*b*, without making any modifications to the NAT device 120 or the CL device 110, with a UDP between the CL device 110 positioned in the global network 160 and the SE device 130 positioned in the private network 161, communication according to protocol for executing data transmission and reception and their control can be implemented without analyzing the entire packet passing through the NAT device 120.

Furthermore, even when responding to new protocol with a different way of writing data sender/destination IP address/port information, modification of the NAT device 120 and the auxiliary device 140 is unnecessary and as a result of naturally responding to the protocol with the SE device 130 that executes the communication with the new protocol, with just the addition of the address-conversion information acquisition section 131*b* to the SE device 130 and a modification in the cooperation function to the address-conversion information acquisition section 131*b* of the communication processing section 131*a*, it is possible to have correspondence by carrying out modification with little effort.

Figure 17:
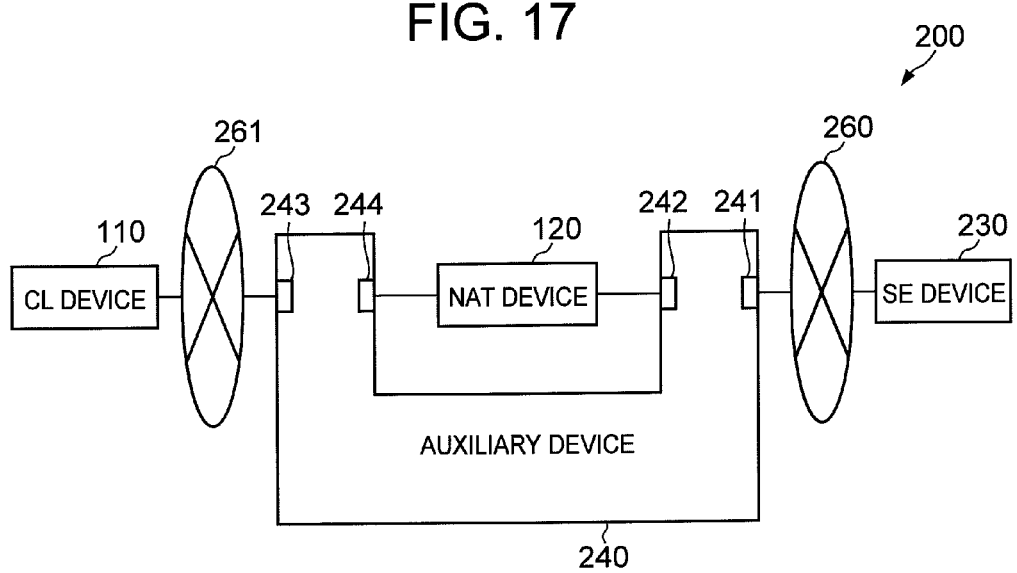
FIG. 17—Schematic diagram of the communication system of the second embodiment.

FIG. 17 is a schematic diagram of the communication system 200 which is the second embodiment of this invention.

The communication system 200 consists of a CL device 110, an NAT device 120, an SE device 230 and an auxiliary device 240.

Here, in this embodiment, in a manner similar to the first embodiment, as with the image distribution protocol of RTSP, after conducting a data forwarding control session with a TCP or a UDP when forwarding data between the CL device 110 and the SE device 230, the data forwarding stream through UDP is carried out. In the data forwarding control session, by carrying out data destination notification which contains both the IP address and the port number of the CL device 110 which is the destination in the payload part from the CL device 110 to the SE device 230 and in response by carrying out data sender notification that contains both the IP address and the port number of the SE device 130 which is the sender in the payload part from the SE device 230 to the CL device 110 the session is established.

This embodiment differs from the first embodiment in that the CL device 110 is connected to the private network 261 and the SE device 230 is connected to the global network 260.

Since the CL device 110 and the NAT device 120 are the same as in the first embodiment, their explanation is omitted.

Figure 18:
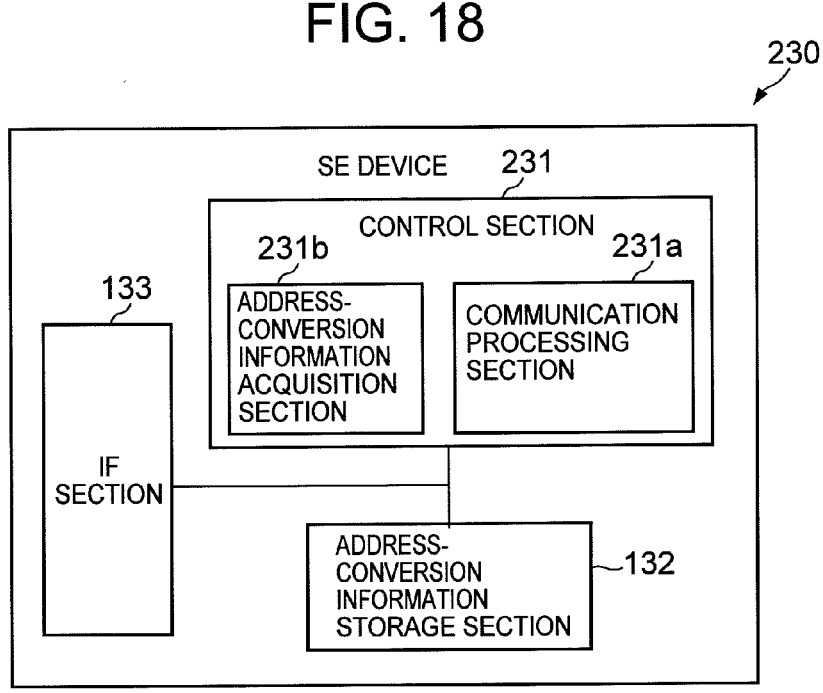
FIG. 18—Schematic diagram of the SE device.

As shown in FIG. 18 (schematic diagram of the SE device 230), the SE device 230 consists of a control section 231, an address-conversion information storage section 132 and an IF section 133. Furthermore, since the control executed by the control section 231 in this embodiment is different when compared to the first embodiment, an explanation is given below regarding the items that are different to the first embodiment.

The control section 231 consists of a communication processing section 231a and an address-conversion information acquisition section 231b.

The communication processing section 231a controls the communication processing through the global network 260.

For example, as described above, when the data forwarding control session between the CL device 110 is set up, the communication processing section 231a receives the data destination notification from the CL device 110 that contains the IP address and the port number of the CL device 110 which is the destination in the payload part and in response controls the processing in which the data sender notification containing the IP address and port number of the SE device 130 which is the sender in the payload part is transmitted.

Additionally, the communication processing section 231a also controls the data forwarding stream processing by means of the UDP after session setup. Here, as described later, in this embodiment, data forwarding is carried out using the global IP address and data reception port number of the NAT device 120 obtained by the address-conversion information acquisition section 231b.

When the address-conversion information acquisition section 231b receives the destination notification from the CL device 110 that contains the IP address and port number of the CL device 110 which is the destination in the payload part through the IF section 133, the address-conversion information acquisition section 231b transmits the IP address and port number of the CL device 110 to the auxiliary device 240 to be described later.

The address-conversion information acquisition section 231b receives at the very least the IP address and port number of the NAT device 120 from the auxiliary device to be described later and stores these in the address-conversion information storage section 132. Furthermore, the communication processing section 231a carries out data forwarding of the data forwarding stream with the IP address and port number of the NAT device 120 stored in the address-conversion information storage section 132 as the destination through the IF section 133 to be described later.

The SE device 230 structured as given above is the same as in the first embodiment and is realizable by the computer 170 as shown, for example, in FIG. 3.

Figure 19:
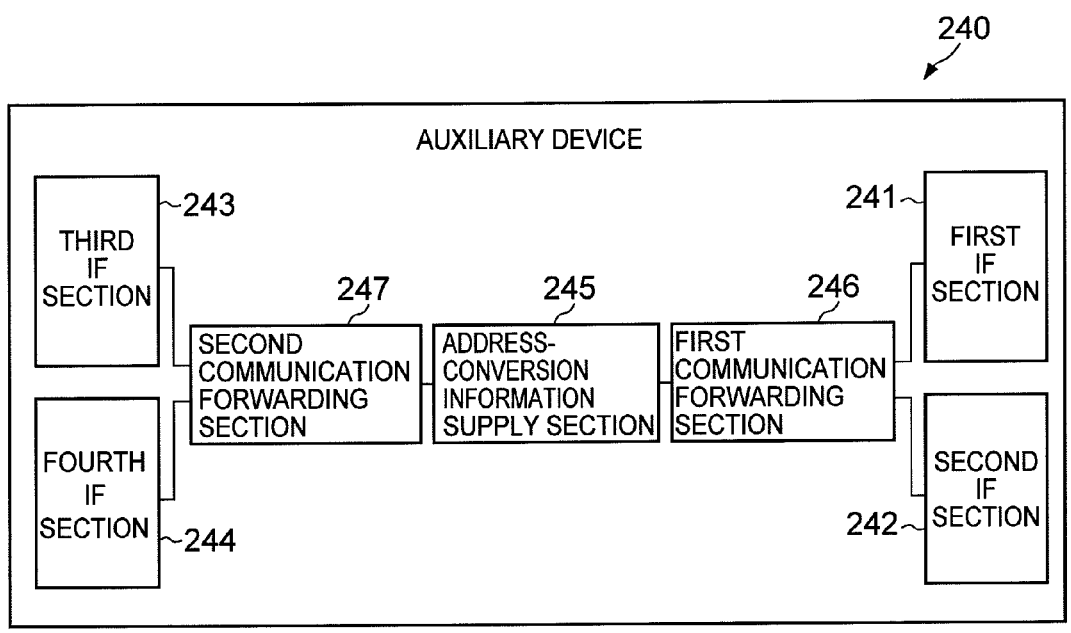
FIG. 19—Schematic diagram of the auxiliary device.

As shown in FIG. 19 (schematic diagram of the auxiliary device 240), the auxiliary device 240 consists of a first IF section 241, a second IF section 242, a third IF section 243, a fourth IF section 244, an address-conversion information supply section 245, a first communication forwarding section 246 and a second communication forwarding section 247.

The first IF section 241, the second IF section 242, the third IF section 243 and the fourth IF section 244 are the interfaces for executing information transmission and reception through the global network 260 or the local network 261.

As shown in FIG. 1, in this embodiment, the first IF section 241 is connected to the global network 260, the second IF section 242 is connected to the interface (not shown in the diagram) of the global network 242 side of the NAT device 120, the third IF section 243 is connected to the local network 261 and the fourth IF section 244 is connected to the interface (not shown in the diagram) of the local network 261 side of the NAT device 120.

The auxiliary device 240 conducts the processing given below when a request for address-conversion information from the SE device 230 is received by the first IF section 241 and passes through other data.

The address-conversion information supply section 245 outputs a dummy packet trial request specifying the IP address and port number of the CL device 110 and the IP address and port number of the SE device 230 to the first communication forwarding section 246 and the second communication forwarding section 247 described below when an address-conversion information request is received from the SE device 230 through the first IF section 241.

The address-conversion information supply section 245 inputs the results of the dummy packet transmission and reception (dummy packet reception notification) by means of the first communication forwarding section 146 and the second communication forwarding section 147 from the first communication forwarding section 247, generates an address-conversion information response specifying the IP address and the port number of the NAT device 120 obtained from the above results and transmits the address-conversion information response to the SE device 230 through the first IF section 141.

When the first communication forwarding section 246 receives the dummy packet trial request from the address-conversion information supply section 245, the first communication forwarding section 246 checks the packet received by the second IF section 242 to monitor that the dummy packet with the IP address and port number of the SE device 230 as the communication destination has been received.

When this dummy packet has been received, the first communication forwarding section 246 extracts the IP address and port number of the NAT device 120 with the dummy packet input as the sender and outputs a dummy packet reception notification specifying the extracted IP address and port number to the address-conversion information supply section 245.

When the second communication forwarding section 247 receives the dummy packet trial request from the address-conversion information supply section 245, the second communication forwarding section 247 generates a dummy packet with the IP address and port number of the SE device 230 as the destination and the IP address and port number of the CL device 110 as the sender and transmits the dummy packet trial request from the fourth IF section 144.

The auxiliary device as structured above is realizable with the computer 180 shown, for example, in FIG. 5 in a manner similar to the first embodiment.

Figure 20:
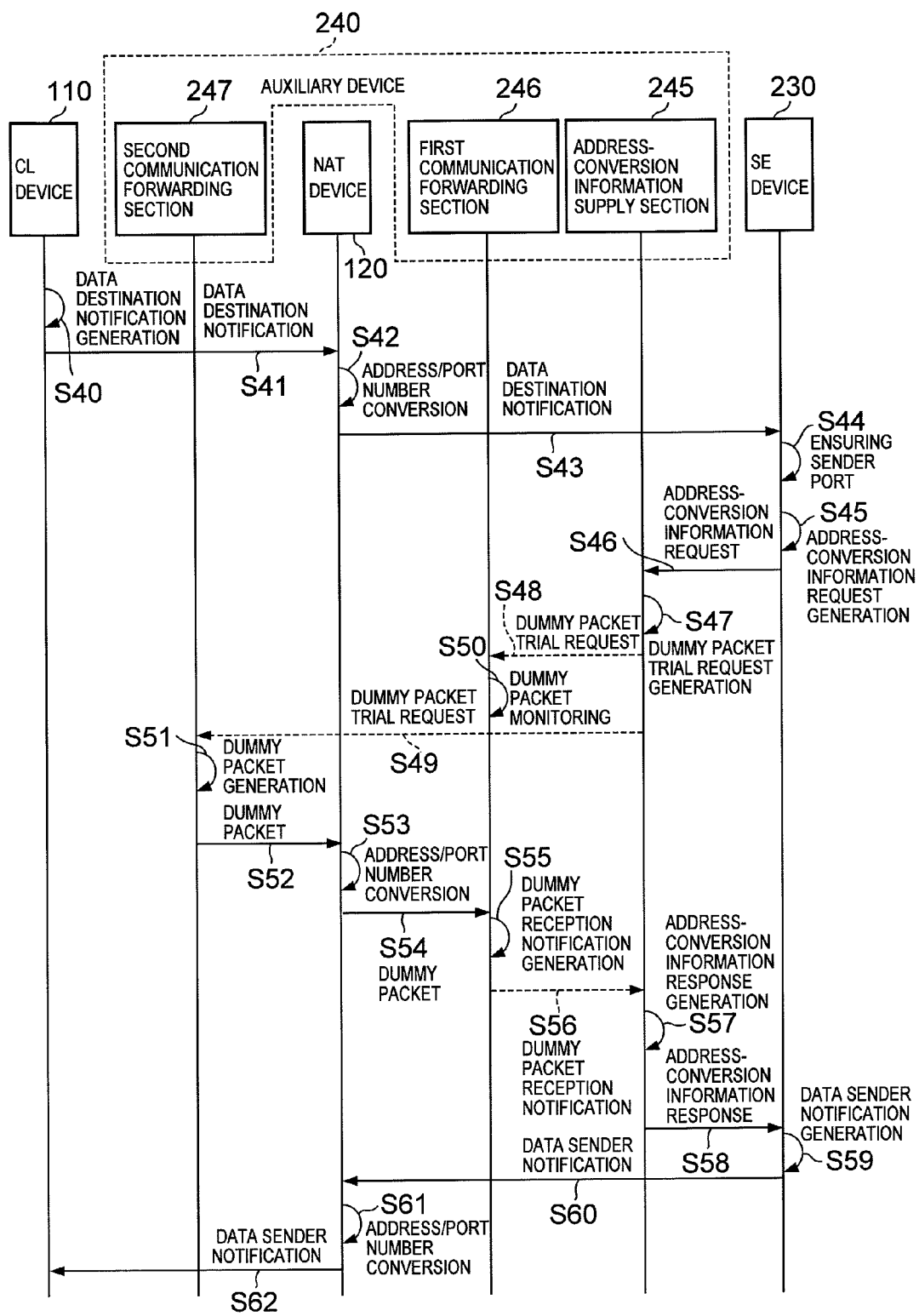
FIG. 20—Flowchart showing the processing after setting up the data forwarding control session in the communication system.

An explanation will now be given using the flowchart in FIG. 20 showing the processing when setting up the data forwarding control session in the communication system 200 with the above structure.

Figure 21:
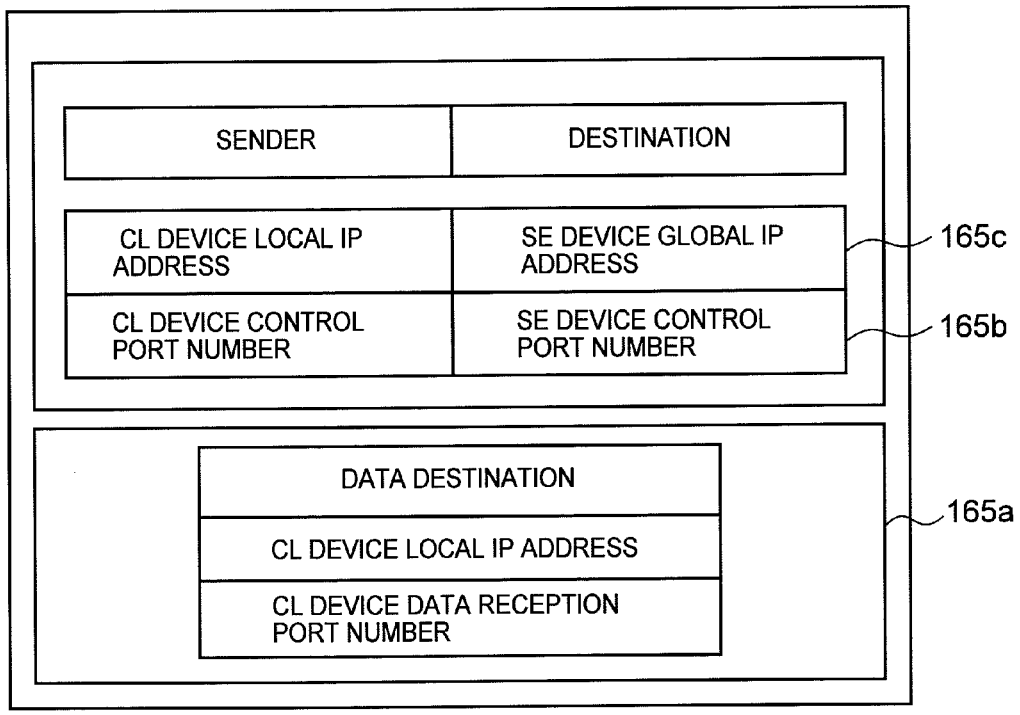
FIG. 21—Schematic diagram of the data destination notification.

First, the CL device 110 generates a data destination notification (S40) and transmits the data destination notification to the SE device 230 (S41). Here, as shown in FIG. 21 (schematic diagram of the data destination notification), the local IP address of the CL device 110 which is the data destination from the SE device 230 and the data reception port number of the CL device 110 are stored, for example, in the payload part 165a, the control port number of the CL device 110 which is the sender and the control port number of the SE device 230 which is the destination are stored in the TCP or the UDP header 165b and the local IP address of the CL device 110 which is the sender and the global IP address of the SE device 230 which is the destination are stored in the IP header 165c.

The NAT device 120 which has received this data destination notification converts the IP address and port number of the sender stored in the header of the data destination notification and converts it to its own NAT device 120 form (S42).

Figure 22:
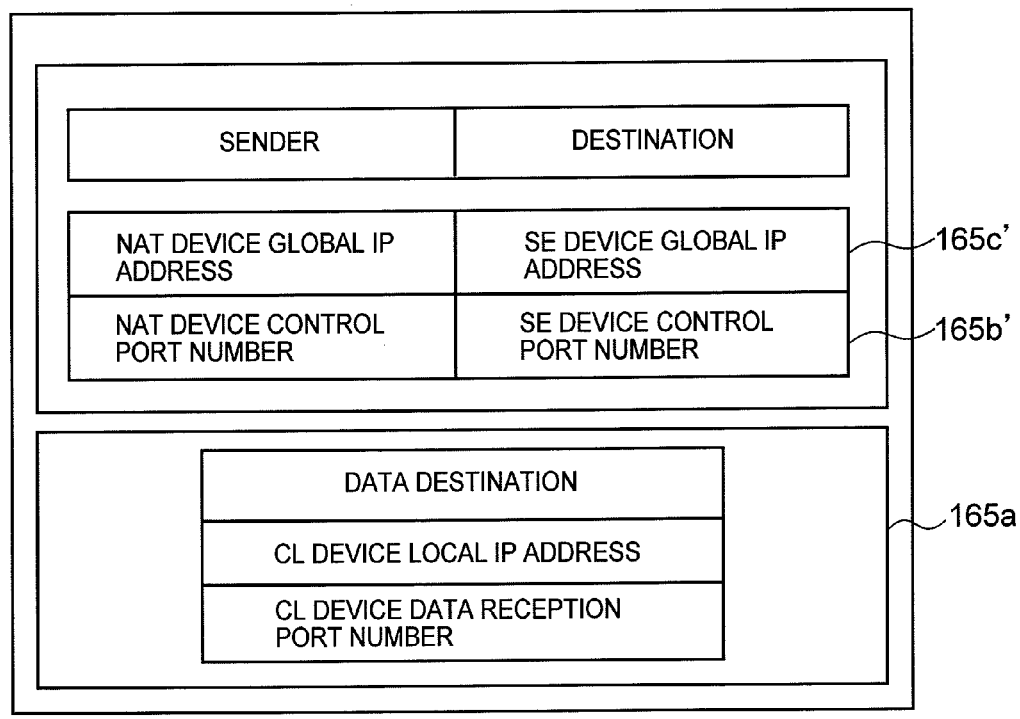
FIG. 22—Schematic diagram of the address—conversion information request.

As shown, for example, in FIG. 22 (schematic diagram of the data destination notification), the control port number of the NAT device 120 is stored in the sender of the TCP or UDP header 165b' while the global IP address of the NAT device 120 is stored in the IP header 165c'.

The data destination notification with the header information converted in this manner is forwarded to the SE device 230 from the NAT device (S43).

The SE device 230 that has received the data destination notification secures the sender port in the communication processing section 231a (S44) and extracts the local IP address and data reception port number of the CL device 110 stored in the payload part of the received data destination notification.

Figure 23:
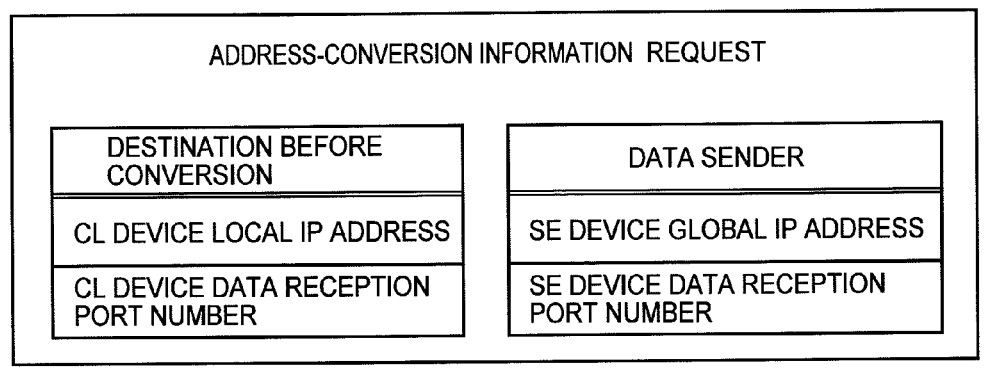
FIG. 23—Schematic diagram of the address—conversion information request.

The information acquisition section 231b of the SE device 230 generates an address-conversion information request (e.g., refer to FIG. 23) with the local IP address and data reception port number of the CL device 110 extracted by the communication processing section 231a as the destination before conversion and with the global IP address and data transmission port number of the SE device 230 as the data sender (S45) and transmits the address-conversion information request to the auxiliary device 240 through the IF section 133 (S46). Furthermore, in order to differentiate the transmission to the auxiliary device 240 from other data, the transmission is transmitted using the unique IP address of the auxiliary device 240 or the unique port number in the address-conversion information request.

Figure 24:
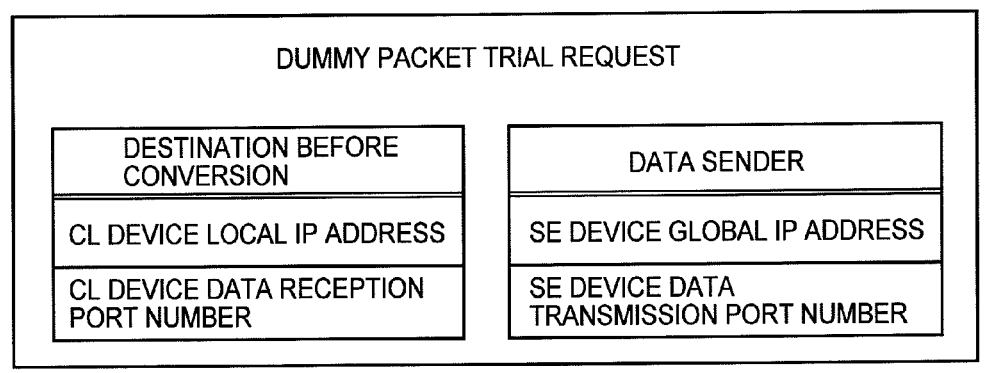
FIG. 24—Schematic diagram of the dummy packet trial request.

The address-conversion information supply section 245 which has received the address-conversion information request through the first IF section 241 generates a dummy packet trial request (e.g., refer to FIG. 24) with the local IP address and data reception port number of the CL device 110 specified as the destination before conversion in the address-conversion information request and with the global IP address and data transmission port number of the SE device 230 specified as the data sender in the address-conversion information request as the data sender (S47) and outputs the dummy packet trial request to the first communication forwarding section 246 and the second communication forwarding section 247 (S48, S49).

Additionally, in order to make sure in the output to the above sections that the dummy packet transmitted from the second transmission forwarding section 247 has been received by the first communication forwarding section 246, it should be output to the second communication forwarding section 247 after being output to the first communication forwarding section 246.

The dummy packet received by the second IF section 242 is checked by the first communication forwarding section 246 which has received the dummy packet trial request to monitor that the dummy packet with the IP address and port number of the SE device 230 as the destination has been received (S50).

Figure 25:
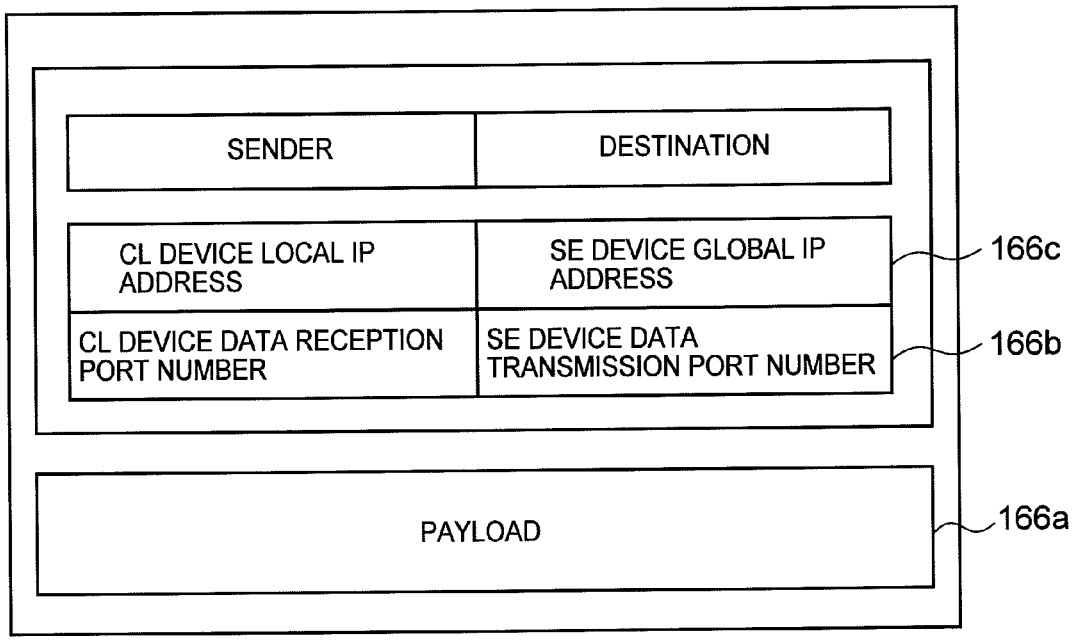
FIG. 25—Schematic diagram of the dummy packet.

Furthermore, as shown, for example, in FIG. 25 (schematic diagram of the dummy packet), a dummy packet is generated in which optional data (e.g., identifying information that can identify that it is the dummy packet) or null data is stored in the payload part 166a by the second communication forwarding section 247 which has received the dummy packet trial request, the data reception port number of the CL device 110 extracted from the dummy packet trial request and the data transmission port number of the SE device 230 are stored respectively as the sender and the destination in the UDP header 166b and in which the local IP address of the CL device 110 extracted from the dummy packet trial request as the sender and the global IP address of the SE device 230 as the sender are stored in the IP header 166c (S51) and transmitted to the fourth IF section 244 (S52).

Figure 26:
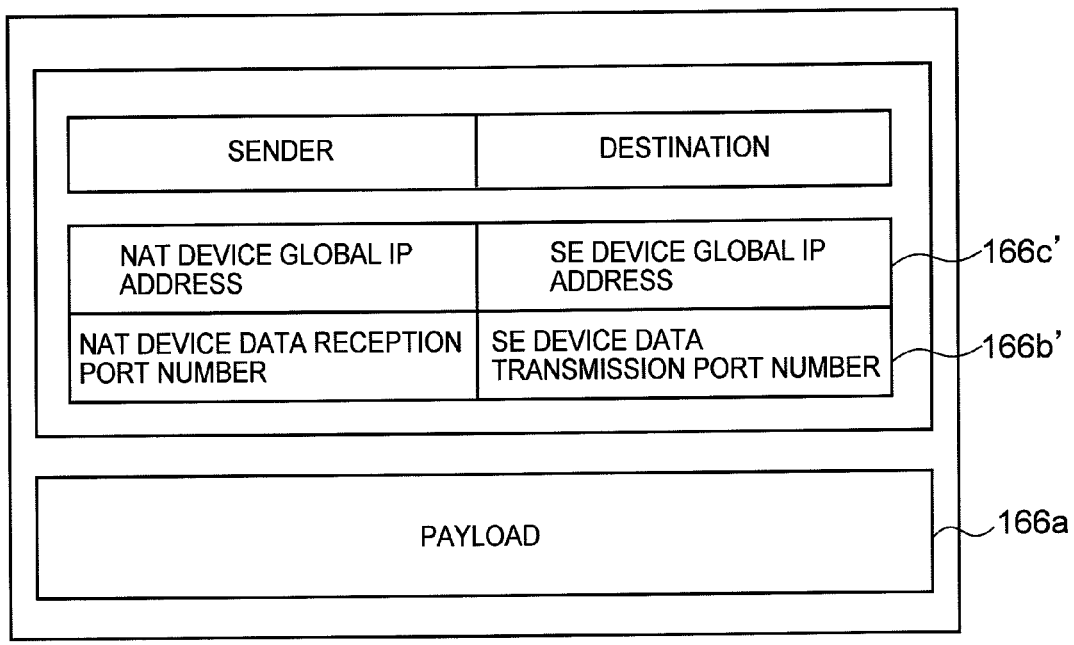
FIG. 26—Schematic diagram of the dummy packet.

As shown, for example, in FIG. 26 (schematic diagram of the dummy packet), in the NAT device 120, the UDP header 166b' of the sender of the received dummy packet converts to the data reception port number of the NAT device 120, the IP header 166c' of the sender converts to the global IP address of the NAT device 120 and these are transmitted to the SE device 230 which is the destination (S54).

Figure 27:
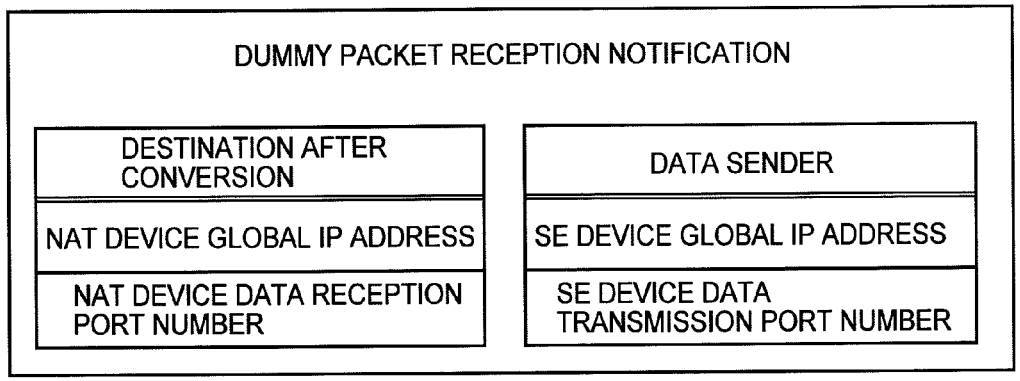
FIG. 27—Schematic diagram of the dummy packet reception notification.

In the first transmission forwarding section 246 which has received the dummy packet through the second IF section 242, the global IP address and data reception port number of the NAT device 120 which is the sender and the global IP address and data transmission port number of the SE device 230 which is the destination are extracted from the received dummy packet and, as shown, for example, in FIG. 27 (schematic diagram of the dummy packet reception notification), a dummy packet reception notification is generated in which the global IP address and data reception port number of the NAT device 120 and the global IP address and data transmission port number of the SE device 230 are respectively specified as the destination after conversion and the data sender (S55), and output to the address-conversion information supply section 245 (S56).

Figure 28:
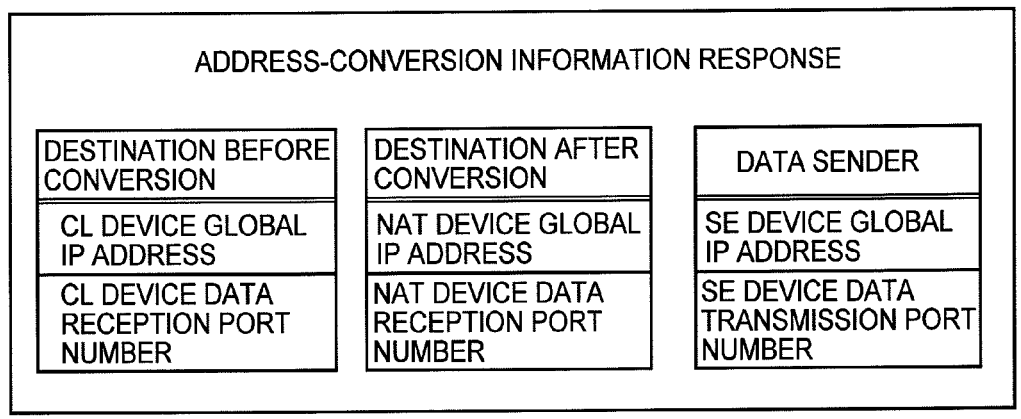
FIG. 28—Schematic diagram of the address—conversion information response.

In the address-conversion information supply section 245 which has received the dummy packet reception notification, the global IP address and data reception port number of the NAT device 120 and the global IP address and data transmission port number of the SE device 230 are extracted from the dummy packet reception notification and the local IP address and data reception port number of the CL device 110 included in the address-conversion information request received in Step S46 are also extracted. Then, as shown, for example in FIG. 28 (schematic diagram of the address-conversion information response), the address-conversion information supply section 245 generates an address-conversion information response specifying the local IP address and data reception port number of the CL device 110 as the destination before conversion, a data sender notification is generated in which the global IP address and data reception port number of the NAT device 120 as the destination after conversion and the global IP address and data transmission port number of the SE device 230 as the data sender (S57) and transmits the address-conversion information response to the SE device 230 through the first IF section 241 (S58).

Figure 29:
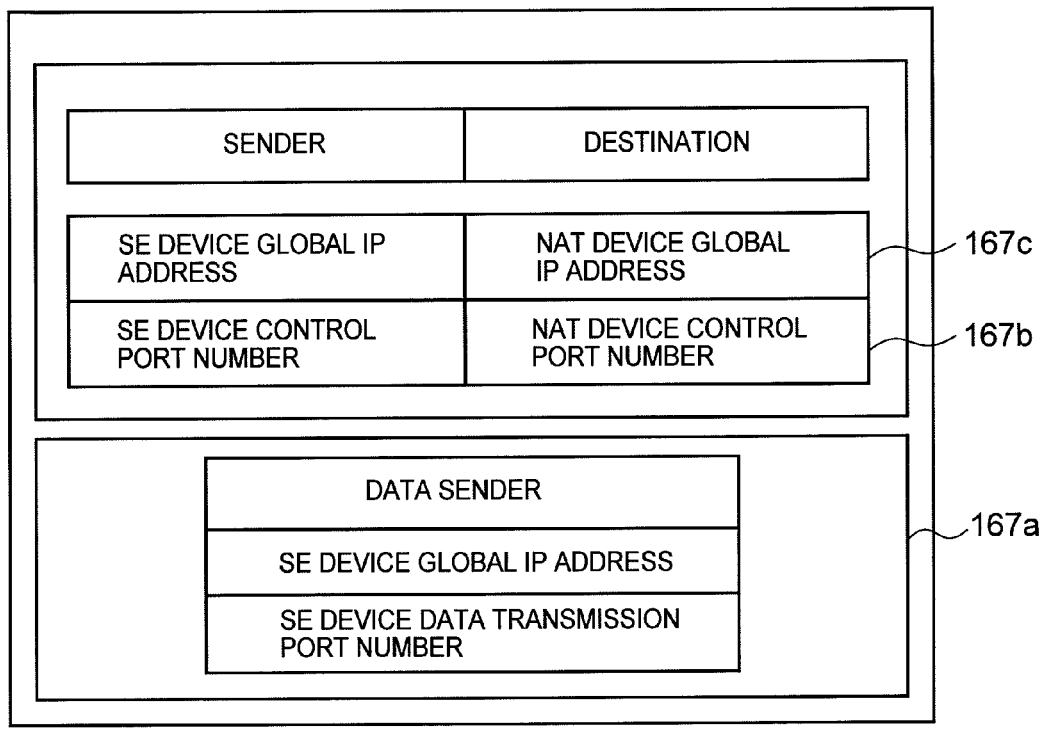
FIG. 29—Schematic diagram of the data sender notification.

In the SE device 230 which has received the address-conversion information response, the address-conversion information response is stored in the address-conversion information storage section 132 and, as shown, for example, in FIG. 29 (schematic diagram of the data sender notification), the global IP address and data transmission port number of the SE device 230 are stored in the payload section 167a, the control port number of the SE device 230 which is the sender and the control port number of the NAT device 110 which is the destination are stored in the TCP or the UDP header 167b and the global IP address of the SE device 230 which is the sender and the global IP address of the NAT device 120 which is the destination are stored in the IP header 167c (S59) and transmitted to the CL device 110 through the IF section 133 (S60).

Figure 30:
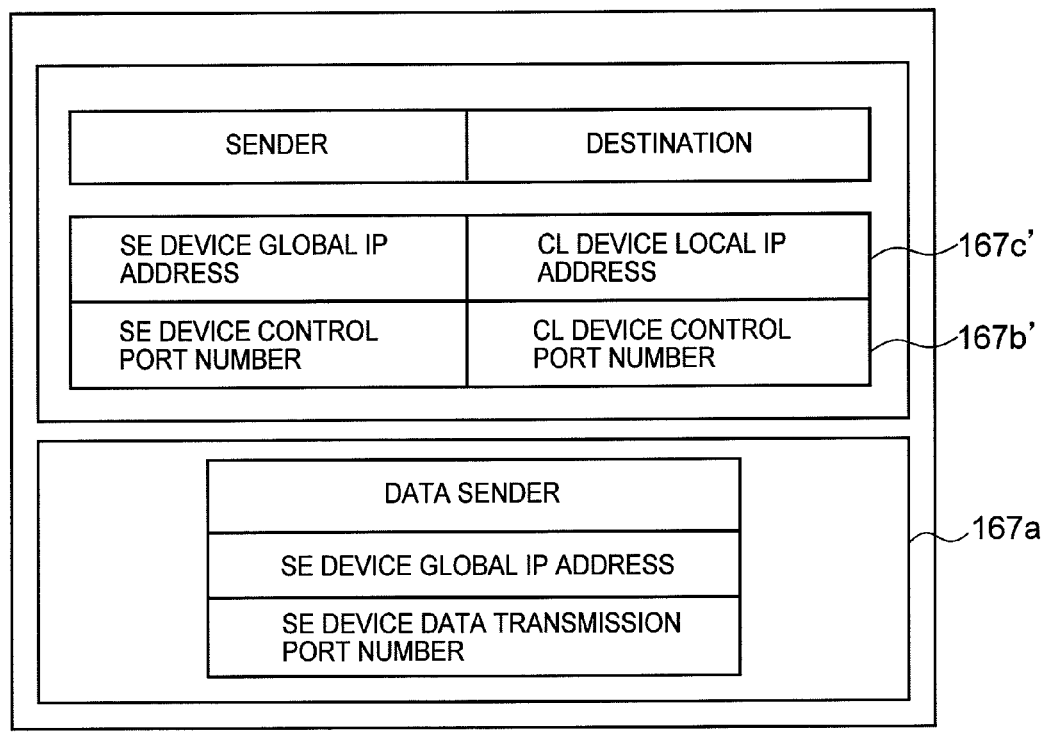
FIG. 30—Schematic diagram of the data sender notification.

As shown, for example in FIG. 30 (schematic diagram of the data sender notification), the data sender notification transmitted in the above manner has the destination of the TCP or the UDP header 167b' converted to the control port number of the CL device 110 and also has the destination of the IP header 167c' converted to the local IP address of the CL device 110 (S61) and the data sender notification is forwarded to the CL device 110 (S62).

In the data forwarding stream processing by the UDP after session setup, since, in the communication processing section 231a of the SE device 230, communication is executed using the global IP address and data reception port number of the NAT device 120 contained in the address-conversion information response obtained in Step S58 and not the local IP address and data reception port number of the CL device 110 which is the destination of the data stored in the payload section of the data destination notification, it is possible to execute data forwarding normally through the global network 260.

As shown above, through the cooperation in this embodiment of a NAT device 120, a auxiliary device 240 that relays communication between networks on both sides of the NAT device 120 and an address-conversion information acquisition section 231b set up in the SE device 230, without making any modifications in the NAT device 120 or the CL device 110, communication with protocol that executes data transmission and reception and their control without analysis of the entire packet passing through the NAT device 120 can be realized with a UDP between the CL device 110 connected to a private network 260 and the SE device 230 connected to a global network 261.

Furthermore, even when responding to protocol with a different form of writing the data sender/destination IP address/port information, no modification of the NAT device 120 and the auxiliary device 240 is required and in order to correspond as a matter of course to this protocol with an SE device 230 which communicates with the new protocol, correspondence is possible with just the addition of an address-conversion information acquisition section 231b to the SE device 230 and a modification in the link function to the address-conversion information acquisition section 231b of the communication processing section 231a and modification can be performed with little effort.

Figure 31:
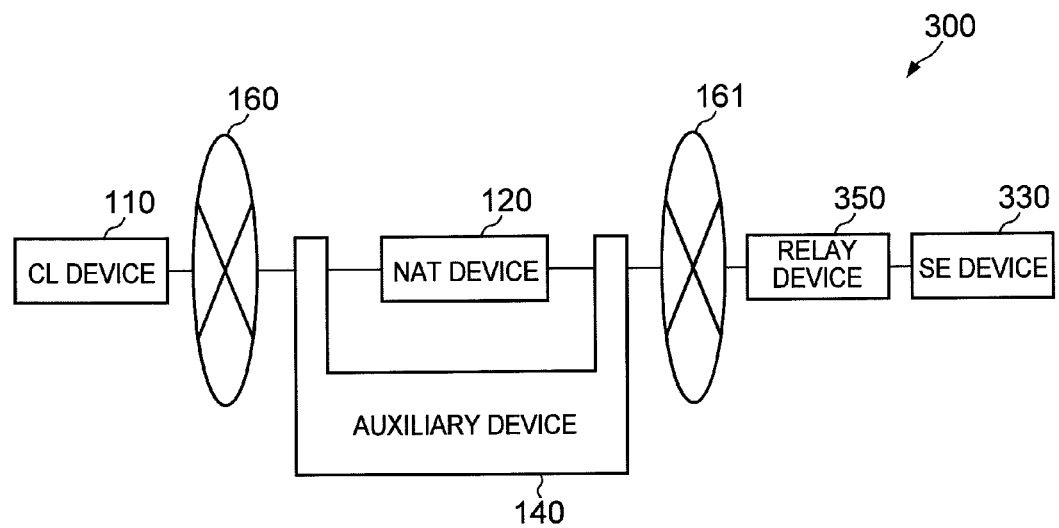
FIG. 31—Schematic diagram of the communication system of the third embodiment.

FIG. 31 is a schematic diagram of the communication system 300 which is the third embodiment of this invention.

As shown in the diagram, the communication system 300 consists of a CL device 110, an NAT device 120, an SE device 330, an auxiliary device 140 and a relay device 350.

Here in this embodiment in a manner similar to the first embodiment, as with the image distribution protocol of RTSP, after conducting a data forwarding control session with a TCP or a UDP when forwarding data between the CL device 110 and the SE device 330, the data forwarding stream through UDP is carried out. In the data forwarding control session, by carrying out data destination notification which contains both the IP address and the port number of the CL device 110, which is the destination in the payload section from the CL device 110 to the SE device 330, and in response by carrying out data sender notification that contains both the IP address and the port number of the SE device 330, which is the sender in the payload section from the SE device to the CL device 110, the session is established.

Additionally, compared to the first embodiment, the communication system 300 in this embodiment differs further by having a relay device 350 added and an explanation will be given below regarding items pertaining to the difference.

In the first embodiment there was an address-conversion information acquisition section 131b in the SE device 130 and it was possible to obtain the IP address and port number of the NAT device 120 with this address-conversion information acquisition section 131b but for this embodiment, the processing conducted by the address-conversion information acquisition section 131b of the SE device 130 in the first embodiment is conducted with the relay device 350.

Consequently, as with a normal server device used with an RTSP image distribution protocol, the SE device 330 in this embodiment sets up the session by carrying out data sender notification with respect to the data destination notification received from the CL device 110 and the data forwarding stream is executed with the UDP and since these are similar to conventionally used devices, their explanation is omitted.

Figure 32:
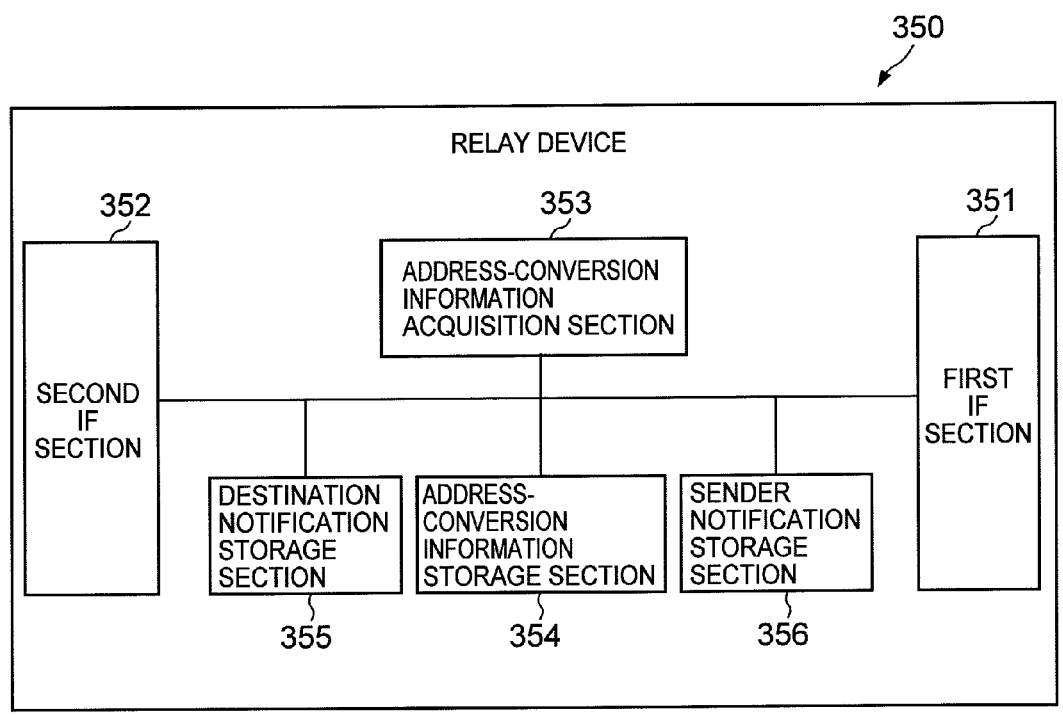
FIG. 32—Schematic diagram of the relay device.

As shown in FIG. 32 (schematic diagram of the relay device 350), the relay device 350 consists of a first IF section 351, a second IF section 352, an address-conversion information acquisition section 353, an address-conversion information storage section 354, a destination notification storage section 355 and a sender notification section 356.

The first IF section 351 is the interface for executing information transmission and reception between the SE device 330.

The second IF section 352, is the interface for conducting information transmission and reception through the private network 161.

The address-conversion information acquisition section 353 monitors the packet transmitted from the SE device 330 and when a destination notification transmitted to the SE device 330 is received, or when a sender notification transmitted from the SE device 330 is received, the processing below is carried out and other packets are passed through.

First, when the address-conversion information acquisition section 353 receives the sender notification transmitted to the SE device 330, the global IP address and data reception port number of the CL device 110 stored in the payload part of the data destination notification and the global IP address and control port number of the CL device 110 which is the information of the sender stored in the IP header 162c and the TCP or the UDP header are connected and stored in the destination notification storage section 355.

Furthermore, when the destination port number stored in the TCP or the UDP header of the packet is the control port number of the SE device 330, it is possible with the address-conversion information acquisition section 353 to determine that it is the destination notification.

Additionally, when the sender notification is transmitted from the SE device 330, with the address-conversion information acquisition section 353 the sender notification is stored in the sender notification sender storage section 355.

Here, when the IP address and port number stored in the packet IP header and TCP or UDP header agree with the global IP address and control port number of the CL device 110 stored in the destination notification storage section 355, the address-conversion information acquisition section 353 determines that this is the sender notification.

Next, the address-conversion information acquisition section 353 transmits the IP address and data reception port number of the CL device 110 which is the destination of the sender notification and the specified information (address-conversion information request) to the auxiliary device 140.

The address-conversion information acquisition section 353 receives at the very least the IP address and the data transmission port number of the NAT device 120 from the auxiliary device 140 and stores them in the address-conversion information storage section 354.

Next, the address-conversion information acquisition section 353 replaces the received IP address and the data transmission port number of the NAT device 120 with the IP address and data transmission port number of the SE device 330 stored in the payload part of the sender notification stored in the sender notification storage section 355 and transmits the replaced sender notification to the CL device 110.

Furthermore, the IP address or the port number for carrying out communication with the auxiliary device 140 is also stored in the address-conversion information acquisition section 354.

Figure 33:
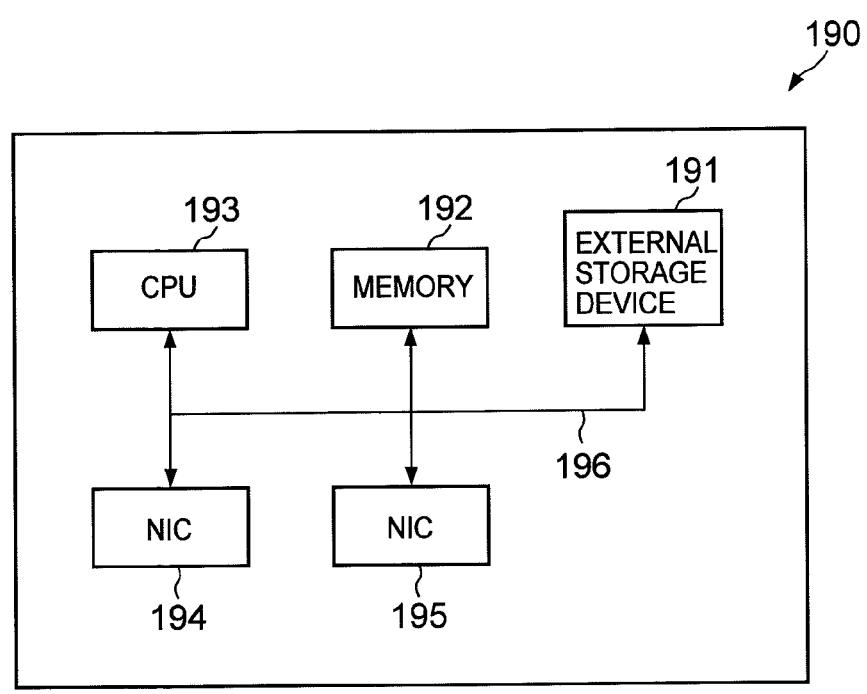
FIG. 33—Schematic diagram of the computer.

The relay device 350 structured as given above is realizable in a computer 190 shown, for example, in FIG. 33 (schematic diagram of the computer 190).

For example, the computer 190 consists of an external storage device 191, the memory 192, a CPU 193, NICs 194 and 195 and a bus 196 connecting these.

The address-conversion information acquisition section 353 is realizable by having a predetermined program stored in the external storage device 191 read into the memory 192 and executed by the CPU 193 and the address-conversion information storage section 354 and the sender notification storage section 355 are realizable with the external storage device 191 while the first IF section 351 and the second IF section 352 are realizable with respectively the NIC 194 and the NIC 195.

Figure 34:
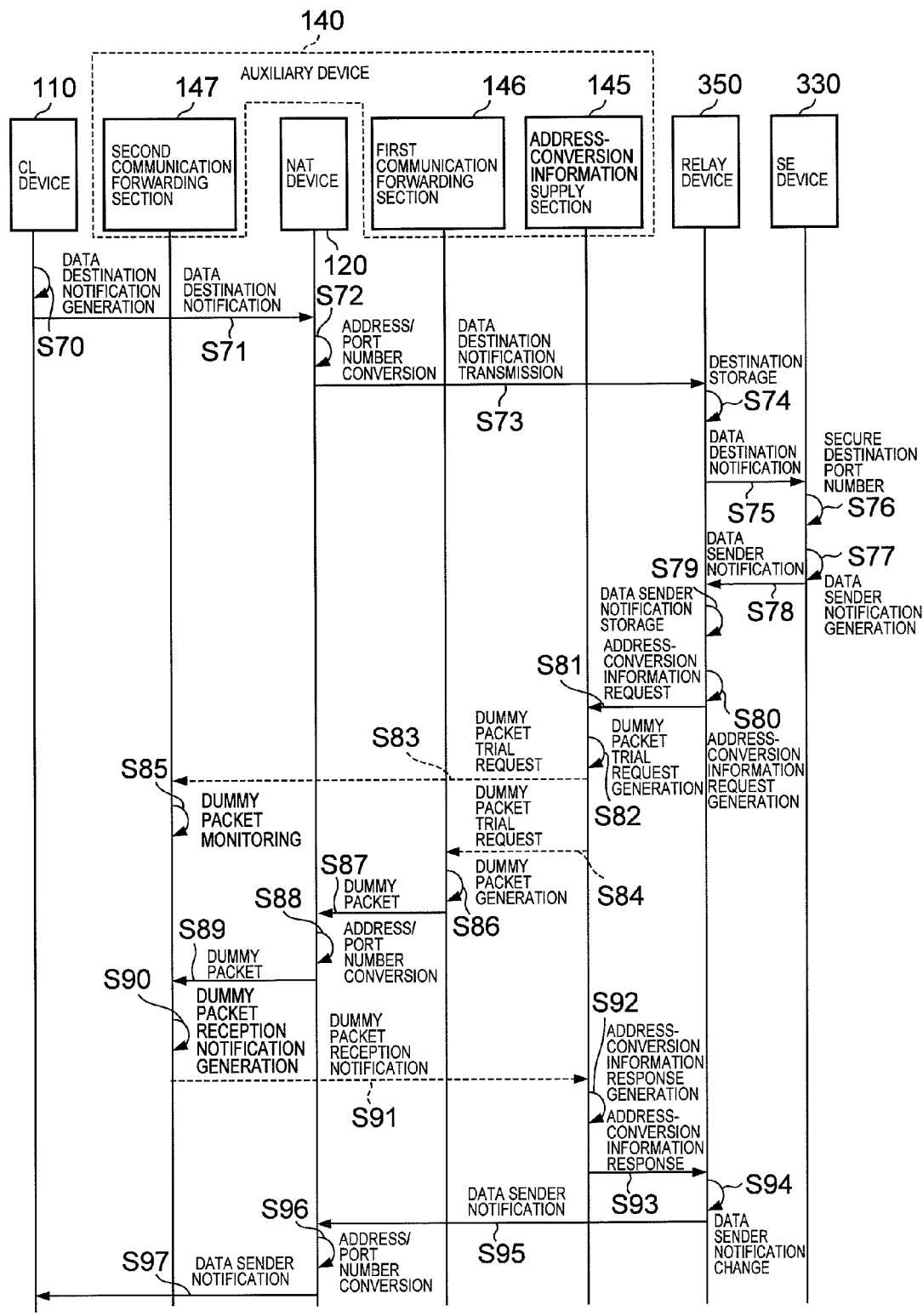
FIG. 34—Flowchart showing the processing after setting up a data forwarding control session in the communication system.

An explanation is now given using the flowchart shown in FIG. 34 about processing when setting up the data forwarding control session in the communication system 300 structured as given above.

First, the CL device 110 generates a data destination notification (S 70) and transmits the data destination notification to the SE device 330 (S71). Here, for the transmitted data destination notification in a manner similar to the first embodiment, as shown, for example, in FIG. 7, the global IP address of the CL device 110 which is the destination of the data from the SE device 330 and the data reception port number of the CL device 110 are stored in the payload part 162a, the control port number of the CL device 110 which is the sender and the control port number of the NAT device 120 which is the destination are stored in the TCP or the UDP header 162b and the global IP address of the CL device 110 which is the sender and the global IP address of the NAT device 120 which is the destination are stored in the IP header 162c.

The NAT device 120 which has received this data destination notification converts the IP address and port number of the destination stored in the header of the data destination notification to that of the SE device 330 (S72). For example, as shown in FIG. 8, the control port number of the SE device 330 is stored in the TCP or the UDP header 162b' and the local IP address of the SE device 330 is stored in the IP header 162c'.

The data destination notification in which the above header information is stored is forwarded to the SE device 330 from the NAT device 120 (S73).

The relay device 350 checks the IP header of the packet received by the second IF section 352 and the TCP or the UDP header and when the destination port number is the SE device 330, the global IP address and the data reception port number of the CL device 110 which is stored in the payload part thereof and the global IP address and the control port number of the CL device 110, which is the information of the sender stored in the IP header 162c and the TCP or the UDP header, are connected, stored in the destination notification storage section 355 and the data destination notification is forward to the SE device 330 (S75).

Figure 35:
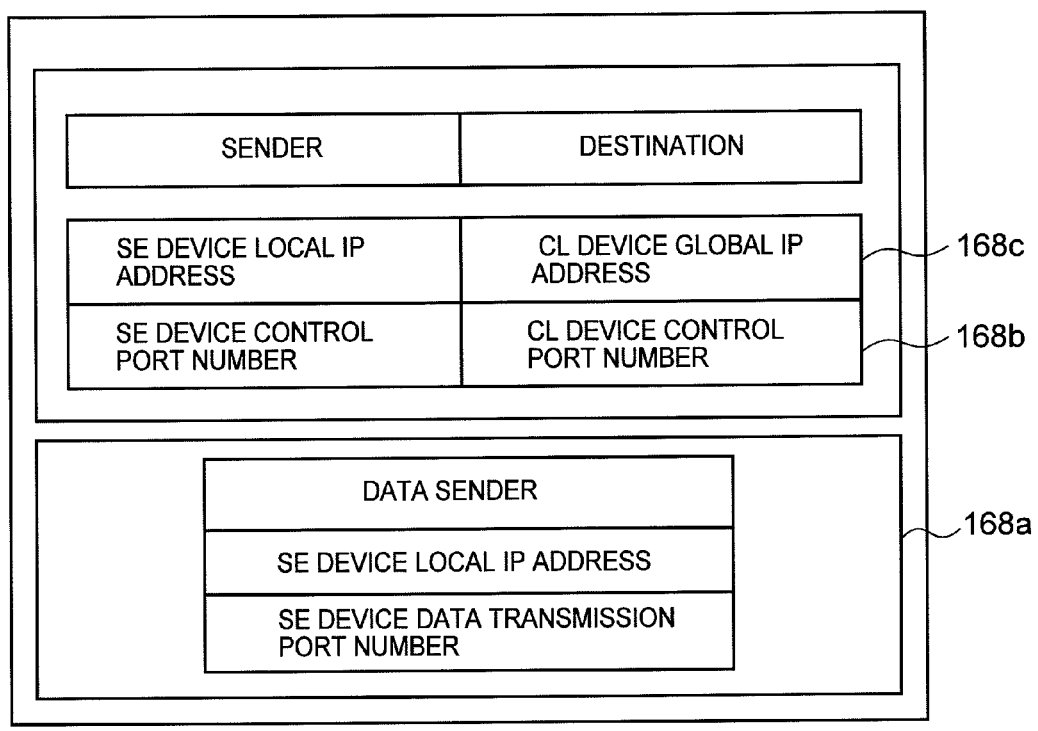
FIG. 35—Schematic diagram of the data sender notification.

The sender port is secured by the SE device 330 and the global IP address and the data reception port number of the CL device 110 stored in the payload part of the received data destination notification are extracted. For example, as shown in FIG. 35 (schematic diagram of the data sender notification), a data sender notification is generated (S77) by the SE device 330 in which the local IP address and the data transmission port number of the SE device 330 are stored in the payload part 168a, the control port number of the SE device 330, which is the sender, and the control port number of the CL device 110, which is the destination, are stored in the TCP or UDP header 168b and the local IP address of the SE device 330, which is the sender, and the global IP address of the CL device 110, which is the destination, are stored in the IP header 168c and forwarded to the CL device 110 (S78).

When the sender notification transmitted from the SE device 330 is received through the first IF section 351, the address-conversion information acquisition section 353 of the relay device 350 stores the sender notification in the sender notification storage section 355 (S79). Furthermore, when the IP address and the port number stored in the IP header of the packet and the TCP or the UDP header are in agreement with the global IP address and control port number of the CL device 110 stored in the destination storage section 355, the address-conversion information acquisition section 353 determines that this is the sender notification.

The address-conversion information acquisition section 353 of the relay device 350 generates an address-conversion information request (e.g., refer to FIG. 9) with the global IP address and data reception port number of the CL device 110 stored in the destination notification storage section 355 in Step S74 as the data destination and the local IP address and data transmission port number of the SE device 330 as the sender before conversion and transmits them to the auxiliary device 140 through the second IF section 352 (S81). Additionally, in order to differentiate this from other data, the transmission to the auxiliary device 140 uses the unique IP address of the auxiliary device 140 or the unique port number in the address-conversion information request.

The address-conversion information supply section 145 which has received the address-conversion information request through the first IF section 141 generates a dummy packet trial request (e.g., refer to FIG. 10) with the global IP address and data reception port number of the CL device 110 specified in the address-conversion information request as the data destination and the local IP address and data transmission port number of the SE device 330 as the sender before conversion (S82) and outputs them to the second communication forwarding section 147 and the first communication forwarding section 146 (S83, S84).

Furthermore, to ensure that the dummy packet transmitted from the first communication forwarding section 146 has been received by the second communication forwarding section 147, it is preferable that the dummy packet be output to the first communication forwarding section 146 after being output to the second communication forwarding section 147.

The packet received by the fourth IF section 144 is checked by the second communication forwarding section 147 which has received the dummy packet trial request and the reception of the dummy packet with the IP address and port number of the CL device 110 as the destination is monitored (S85).

Additionally, as shown, for example, in FIG. 11, a dummy packet is generated in the first communication forwarding section 146 which has received the dummy packet trial request in which optional data (e.g., identifying information which can identify that it is the dummy packet) or null data is stored in the payload part 163a, the data transmission port number of the SE device 330 extracted from the dummy packet trial request and the data reception port number of the CL device 110 are stored respectively as the sender and the destination in the UDP header 163b and the local IP address of the SE device 330 extracted from the dummy packet trial request and the global IP address of the CL device 110 are stored respectively as the sender and destination in the IP header 163c (S86) and transmitted to the NAT device 120 side through the second IF section 142 (S87).

As shown, for example, in FIG. 12, in the NAT device 120, the data transmission port number of the NAT device 120 is stored in the UDP header 163b' of the sender of the received dummy packet and the global IP address of the NAT device 120 is stored in the IP header 163c' of the sender (S88) and these are transmitted to the CL device 110 which is the destination (S89).

The global IP address and data reception port number of the CL device 110 and the global IP address and data transmission port number of the NAT device 120 are extracted from the received dummy packet in the second communication forwarding section 147 which has received the dummy packet through the fourth IF section 144 and as shown, for example in FIG. 13, a dummy packet reception notification is generated specifying the global IP address and data reception port number of the CL device 110 as the data destination and the global IP address and data transmission port number of the NAT device 120 as the sender after conversion (S90) and this is output to the address-conversion information supply section 145 (S91).

The global IP address and data reception port number of the CL device 110 and the global IP address and data transmission port number of the NAT device 120 are extracted from the dummy packet reception notification in the address-conversion information supply section 145 which has received the dummy packet reception notification and the local IP address and data transmission port number of the SE device 330 included in the address-conversion information request received in Step S81 are also extracted. As shown, for example, in FIG. 14, the address-conversion information supply section 145 generates an address-conversion information response specifying the global IP address and the data reception port number of the CL device 110 as the data destination, the global IP address and data transmission port number of the NAT device 120 as the sender after conversion and the local IP address and data transmission port number of the SE device 330 as the sender before conversion (S92) and transmits this to the relay device 350 through the first IF section 141 (S93).

In the relay device 350 which has received the address-conversion information response, the received address-conversion information response is stored in the address-conversion information storage section 354 and the data sender information stored in the payload part 168a (refer to FIG. 35) of the data sender notification stored in the reply sender notification storage section 356 is changed to the global IP address and data transmission port number of the NAT device 164a (S94) and this is transmitted to the CL device 110 through the second IF section 133 (S95).

As shown, for example, in FIG. 16, in the above transmitted data sender notification the sender of the TCP or UDP header 164b' is converted to the control port number of the NAT device 120 and the sender of the IP header 164c' is converted to the global IP address of the NAT device 120 (S96) and this is forwarded to the CL device 110 (S97).

By means of the above processing, in this embodiment also in a manner similar to the first embodiment, since the port number and IP address stored in the payload part 164a of the data sender communication received by the CL device 110 and the subsequent port number stored in the UDP header 164b' of the packet in the data forwarding stream received by the CL device 110 and the IP address stored in the IP header 164c' are in agreement, this can be processed as valid data in the CL device 110.

Furthermore, by linking the NAT device 120, the auxiliary device 140 set up between networks 160 and 161 on both sides of the NAT device 120 and the relay device in this embodiment, communication, without any modifications to the NAT device 120, the CL device 110 and the SE device 330, through protocol that executes data transmission and reception and their control by means of a UDP between the CL device 110 positioned in the global network 160 and the SE device positioned in the private network 161 can be realized without analysis of the entire packet passing through the NAT device 120.

Additionally, even when responding to new protocol in which the written forms of the data sender/destination IP address/port information are different, no modification in the NAT device 120 and the auxiliary device 140 is necessary and correspondence can easily be effected by modifying or installing the relay device 350.

The specification and drawings are, accordingly, to be regarded in an illustrative rather than a restrictive sense. It will, however, be evident that various modifications and changes may be made thereto without departing from the spirit and scope of the invention as set forth in the claims.

What is claimed is:

1. A communication system comprising:
a primary device connected to a primary network;
a secondary device connected to a secondary network; and
an address conversion device that converts address information of communication data transmitted from either the primary device or the secondary device to the other device, into address information corresponding to a network of the other device, and in which
the secondary device stores the address information of the secondary device, in a storage area for the application data in the communication data, and transmits the address information to the primary device, wherein
an auxiliary device is provided to handle communication between the address conversion device, the primary device and the secondary device,
wherein the secondary device sends a request to the auxiliary device for address-conversion information,
the auxiliary device:
generates communication data for acquiring address-conversion information, the communication data including: an address of the secondary device in the secondary network as a sender address, and an address of the primary device in the primary network as a destination address;
transmits the communication data for acquiring address-conversion information to the address conversion device, through a secondary device side interface thereof; and
receives converted communication data for acquiring address-conversion information from the address conversion device, through the primary device side interface thereof; and
acquires sender address information of the secondary device after conversion by the address conversion device;
responds to the secondary device with the sender address information of the secondary device thus acquired;
the secondary device stores the address information thus responded from the auxiliary device in the storage area for the application data in the communication data, and transmits the address to the primary device.

2. The communication system according to claim 1, wherein the secondary device requests for the address-conversion information to the auxiliary device when a connection request is made from the primary device and the auxiliary device acquires the address information after being converted by the address conversion device in accordance with the command and notifies the secondary device.

3. A communication system comprising:
a primary device connected to a primary network;
a secondary device connected to a secondary network; and
an address conversion device that converts address information of communication data transmitted from either the primary device or the secondary device to the other device, to address information corresponding to a network of the other device, and in which
the secondary device transmits the communication data based on the address information of the primary device stored in a storage area for the application data in the communication data transmitted from the primary device, to the primary device, wherein
an auxiliary device is provided to handle communication between the address conversion device, the primary device and the secondary device,
wherein the secondary device sends a request to the auxiliary device for address-conversion information,
the auxiliary device:
generates communication data for acquiring address-conversion information, the communication data including: an address of the secondary device in the secondary network as a sender address, and an address of the primary device in the primary network as a destination address;
transmits the communication data for acquiring address-conversion information to the address conversion device, through a secondary device side interface thereof; and
receives converted communication data for acquiring address-conversion information from the address conversion device, through the primary device side interface thereof; and
acquires sender address information of the secondary device after conversion by the address conversion device;
responds to the secondary device with the sender address information of the secondary device thus acquired;
the secondary device stores the address information thus responded from the auxiliary device in the storage area for the application data in the communication data, and transmits the address to the primary device.

4. The communication system according to claim 3, wherein the secondary device requests for the address-conversion information to the auxiliary device when a connection request is made from the primary device and the auxiliary device acquires the address information after being converted by the address conversion device in accordance with the command and notifies the secondary device.

5. A communication system comprising:
a primary device connected to a primary network;
a secondary device connected to a secondary network; and
an address conversion device that converts address information of communication data transmitted from either the primary device or the secondary device, to the address information corresponding to a network of the primary device or the secondary device which had not transmitted the communication data, and in which
the secondary device stores the address information of the secondary device, in a storage area for the application data in the communication data, and transmits the address information to the primary device, wherein a relay device is provided to handle communication between the address conversion device, the primary device and the secondary device,
wherein the secondary device sends a request to the relay device for address-conversion information,
the relay device:
generates communication data for acquiring address-conversion information, the communication data including: an address of the secondary device in the secondary network as a sender address, and an address of the primary device in the primary network as a destination address;
transmits the communication data for acquiring address-conversion information to the address conversion device, through a secondary device side interface thereof; and
receives converted communication data for acquiring address-conversion information from the address conversion device, through the primary device side interface thereof; and
acquires sender address information of the secondary device after conversion by the address conversion device;
responds to the secondary device with the sender address information of the secondary device thus acquired;
the secondary device stores the address information thus responded from the relay device in the storage area for the application data in the communication data, and transmits the address to the primary device.

6. An auxiliary device which acquires address-conversion information showing how address information is converted in an address conversion device that converts address information, corresponding to a secondary network, of communication data to be transmitted to a primary device being connected to a primary network, from a secondary device being connected to a secondary network, to address information corresponding to the primary network, comprising;
a receiving interface at a secondary device side, for receiving the communication data from the secondary device;
a transmitting interface at the secondary device side, for transmitting communication data thus received through the receiving interface at the secondary device side, to the address conversion device;
a receiving interface at a primary device side, for receiving communication data from the address conversion device; and
a transmitting interface at the primary device side, for transmitting communication data thus received through the receiving interface at the primary device side, to the primary device; and
wherein the auxiliary device:
generates, upon receiving a request for address-conversion information from the secondary device, communication data for acquiring address-conversion information, with the communication data including an address of the secondary device in the secondary network as a sender address, and an address of the primary device in the primary network as a destination address;
transmits the communication data for acquiring address-conversion information thus generated, to the address conversion device through the transmitting interface at the secondary device side; and
receives the communication data for acquiring address-conversion information thus converted by the address conversion device, from the address conversion device through the receiving interface at the primary device side;

acquires the sender address information of the secondary device after conversion by the address conversion device, from the communication data for acquiring address-conversion information thus received; and notifies the secondary device of the sender address information of the secondary device thus acquired, from the communication data for acquiring address-conversion information, after conversion by the address conversion device, in order for the secondary device to store the sender address information thus notified in the storage area for the application data in the communication data and transmit the sender address information thus stored to the primary device.

7. The auxiliary device according to claim 6 which acquires the address information after being converted by the address conversion device in accordance with the command from the secondary device and notifies the secondary device.

8. An auxiliary device which acquires address-conversion information showing how address information is converted in an address conversion device that converts address information, corresponding to a primary network, of communication data to be transmitted to a secondary device being connected to a secondary network from a primary device being connected to a primary network, to address information corresponding to the secondary network, comprising;

a receiving interface at a primary device side, for receiving communication data from the primary device;

a transmitting interface at the primary device side, for transmitting communication data thus received through the receiving interface at the primary device side, to the address conversion device;

a receiving interface at the secondary device side, for receiving communication data from the address conversion device; and a transmitting interface at the secondary device side, for transmitting communication data thus received through the receiving interface at the secondary device side, to the secondary device; and wherein the auxiliary device:

generates, upon receiving a request for address-conversion information from the secondary device, the communication data for acquiring address-conversion information, with the communication data including an address of the primary device in the primary network as a sender address, and an address of the secondary device in the secondary network as a destination address;

transmits the communication data for acquiring address-conversion information thus generated, to the address conversion device through the transmitting interface at the primary device side; and receives the communication data for acquiring address-conversion information thus converted by the address conversion device, from the address conversion device through the receiving interface at the secondary device side;

acquires the sender address information of the primary device after conversion by the address conversion device, from the communication data for acquiring address-conversion information thus received; and notifies the secondary device of the sender address information of the primary device thus acquired from the communication data, for acquiring address-conversion information after conversion by the address conversion device, in order for the secondary device to transmit the sender address information after conversion to the primary device as a destination address.

9. The auxiliary device according to claim 8, which acquires the address information after being converted by the address conversion device by:

generating communication data with the address information of the primary device as the sender and the address information of the primary device as the destination;

transmitting the communication data from the primary device to the address conversion device; and receiving the communication data with the secondary device.

10. The auxiliary device according to claim 8 which obtains the address information after being converted by the address conversion device in accordance with the command from the secondary device and notifies the secondary device.

11. A communication method in a communication system comprising:

a primary device connected to a primary network;

a secondary device connected to a secondary network;

an address conversion device that converts address information of communication data transmitted from either the primary device or the secondary device to the other device, into address information corresponding to a network of the other device, and an auxiliary device provided to handle communication between the address conversion device, the primary device and the secondary device, and in which the secondary device stores the address information of the secondary device in a storage area for the application data in the communication data, and transmits the address information to the primary device, wherein the communication method comprises:

the secondary device sending a request to the auxiliary device for address-conversion information, the auxiliary device:

generating communication data for acquiring address-conversion information, the communication data including: an address of the secondary device in the secondary network as a sender address, and an address of the primary device in the primary network as a destination address;

transmitting the communication data for acquiring address-conversion information to the address conversion device, through a secondary device side interface thereof; and receiving converted communication data for acquiring address-conversion information from the address conversion device, through the primary device side interface thereof;

acquiring sender address information of the secondary device after conversion by the address conversion device; and responding to the secondary device with the sender address information of the secondary device thus acquired;

the secondary device storing the address information thus responded from the auxiliary device in the storage area for the application data in the communication data, and transmitting the address to the primary device.

12. A communication method in a communication system comprising:

a primary device connected to a primary network;

a secondary device connected to a secondary network;

an address conversion device that converts address information of communication data transmitted from either the primary device or the secondary device, to a network of the primary device or the secondary device which had not transmitted the communication data; and an auxiliary device provided to handle communication between the address conversion device, the primary device and the secondary device, and in which the secondary device transmits the communication data to the primary device based on the address information of the primary device stored in the storage area for the application data, in the communication data transmitted from the primary device, wherein the communication method comprises:

the secondary device sending a request to the auxiliary device for address-conversion information, the auxiliary device:

generating communication data for acquiring address-conversion information, the communication data including: an address of the secondary device in the secondary network as a sender address, and an address of the primary device in the primary network as a destination address;

transmitting the communication data for acquiring address-conversion information to the address conversion device, through a secondary device side interface thereof; and receiving converted communication data for acquiring address-conversion information from the address conversion device, through the primary device side interface thereof;

acquiring sender address information of the secondary device after conversion by the address conversion device; and responding to the secondary device with the sender address information of the secondary device thus acquired;

the secondary device storing the address information thus responded from the auxiliary device in the storage area for the application data in the communication data, and transmitting the address to the primary device.

* * * * *